US008706829B2

(12) United States Patent
Otsuka

(10) Patent No.: US 8,706,829 B2
(45) Date of Patent: Apr. 22, 2014

(54) COMMUNICATION APPARATUS, CONTROL METHOD FOR COMMUNICATION APPARATUS, AND COMMUNICATION SYSTEM

(75) Inventor: Mitsuru Otsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 785 days.

(21) Appl. No.: 12/092,948

(22) PCT Filed: Nov. 24, 2006

(86) PCT No.: PCT/JP2006/324047
§ 371 (c)(1),
(2), (4) Date: May 7, 2008

(87) PCT Pub. No.: WO2007/061140
PCT Pub. Date: May 31, 2007

(65) Prior Publication Data
US 2009/0240781 A1 Sep. 24, 2009

(30) Foreign Application Priority Data

Nov. 28, 2005 (JP) ................................ 2005-342228

(51) Int. Cl.
G06F 15/16 (2006.01)
G06F 15/177 (2006.01)
(52) U.S. Cl.
USPC .......................................... 709/208; 709/209
(58) Field of Classification Search
USPC .......................... 709/208–210; 710/100, 110
See application file for complete search history.

(56) References Cited

U.S. PATENT DOCUMENTS 6,026,303 A 2/2000 Minamisawa
6,243,826 B1 * 6/2001 Quoc et al. ........................ 714/4
6,876,850 B2 4/2005 Maeshima et al.
(Continued)

FOREIGN PATENT DOCUMENTS

JP 10-155184 6/1998
JP 11-355867 12/1999
(Continued)

OTHER PUBLICATIONS

Ferrari, Gaetano, et al. "Dynamic, channel status driven, re-configurable medium access control for the WIND-FLEX wireless local area network." IST Mobile Communications Summit. 2001. [retrieved from Internet "http://infocom.uniroma1.it/~robby/Pubb_Cusani_pdf/C47.pdf" on Feb. 14, 2013].*

(Continued)

Primary Examiner — Kambiz Zand
Assistant Examiner — Shu Chun Gao
(74) Attorney, Agent, or Firm — Fitzpatrick, Cella, Harper & Scinto

(57) ABSTRACT

In a system that performs communication between master and slave, the device better suited as the master device is not always the master device, since the device that initially constructs the network becomes the master device. A device that enters the network later transmits a restart request on detecting the master device, and if a restart permission is received, the device transfers to a restart state and transmits a master inquiry before the device that was the master device up until that point. Thus, a device that newly enters a network is able to operate as the master device even if a master device already exists in the network.

9 Claims, 22 Drawing Sheets

(56) References Cited

U.S. PATENT DOCUMENTS

| | | | |
|---|---|---|---|
| 6,901,275 B1 * | 5/2005 | Aoyagi | 455/574 |
| 6,965,948 B1 * | 11/2005 | Eneborg et al. | 709/250 |
| 6,980,522 B2 * | 12/2005 | Boyle | 370/252 |
| 7,137,126 B1 * | 11/2006 | Coffman et al. | 719/328 |
| 7,212,833 B2 | 5/2007 | Sugaya | |
| 7,356,360 B2 | 4/2008 | Katayama et al. | |
| 7,359,950 B2 * | 4/2008 | Choi et al. | 709/209 |
| 7,675,869 B1 * | 3/2010 | Anker et al. | 370/255 |
| 2002/0032025 A1 | 3/2002 | Maeshima et al. | |
| 2002/0055978 A1 * | 5/2002 | Joon-Bo et al. | 709/209 |
| 2002/0090914 A1 * | 7/2002 | Kang et al. | 455/41 |
| 2002/0196763 A1 * | 12/2002 | Reynolds et al. | 370/338 |
| 2003/0157950 A1 | 8/2003 | Sugaya | |
| 2003/0220076 A1 | 11/2003 | Katayama et al. | |
| 2004/0043780 A1 | 3/2004 | Sugaya et al. | |
| 2004/0203936 A1 | 10/2004 | Ogino et al. | |
| 2005/0086273 A1 | 4/2005 | Loebbert et al. | |
| 2005/0164697 A1 | 7/2005 | Maeshima et al. | |
| 2008/0071261 A1 * | 3/2008 | Orszulak | 606/34 |

FOREIGN PATENT DOCUMENTS

| | | | |
|---|---|---|---|
| JP | 2002-223217 A | 8/2002 |
| JP | 2002-280925 A | 9/2002 |
| JP | 2003-78531 A | 3/2003 |
| KR | 2000-0037649 A | 7/2000 |
| KR | 2002-0009283 A | 2/2002 |
| WO | 02/25879 A1 | 3/2002 |
| WO | 2004/109996 A1 | 12/2004 |

OTHER PUBLICATIONS

Korean Office Action dated Mar. 29, 2010 in Korean Patent Application No. 10-2008-7015830.

Search Report dated Apr. 23, 2009 in European Application No. 06833849.0.

Japanese Office Action dated Mar. 22, 2011 in corresponding Japanese Patent Application No. 2005-3342228.

* cited by examiner

FIG. 16A

| | |
|---|---|
| DESTINATION MAC ADDRESS | |
| SOURCE MAC ADDRESS | |
| MESSAGE TYPE | |
| DEVICE CAPABILITY | DEVICE CAPABILITY ATTRIBUTE VALUE 1 |
| | DEVICE CAPABILITY ATTRIBUTE VALUE 2 |
| | DEVICE CAPABILITY ATTRIBUTE VALUE 3 |
| | DEVICE CAPABILITY ATTRIBUTE VALUE 4 |

| | MASTER DEVICE | HOME DEVICE |
|---|---|---|
| MAC ADDRESS | 0x000a1bf6e7de | 0x000a1b2c3d4e |
| DEVICE ID | 0x0002abfe | 0x00012a3d |
| DEVICE TYPE | PRINTER | DIGITAL CAMERA |
| DISPLAY UNIT CAPABILITY | 2-COLOR LED | 0.1 MEGAPIXEL, 2-INCH LCD |
| OPERATION UNIT CAPABILITY | BUTTON 1 | UP / DOWN / LEFT / RIGHT KEYS & BUTTON 1 |

1602

F I G. 16C
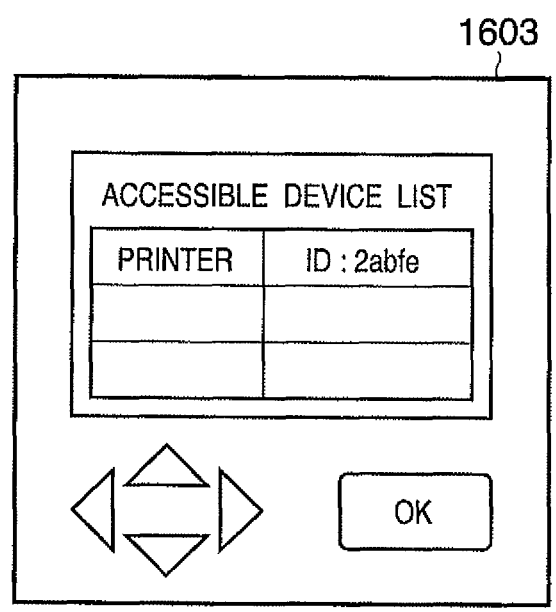

COMMUNICATION APPARATUS, CONTROL METHOD FOR COMMUNICATION APPARATUS, AND COMMUNICATION SYSTEM

This application is a National Stage application under 35 U.S.C. §371 of International Application No. PCT/JP2006/324047, filed on Nov. 24, 2006, the contents of which are incorporated by reference herein.

TECHNICAL FIELD

The present invention relates to a communication apparatus that operates in a network as master or slave.

BACKGROUND ART

In recent years, devices equipped with a wireless function typified by an IEEE802.11 wireless LAN (Local Area Network) have been commercialized and used in large numbers.

When communication via a wireless network is performed between a plurality of devices, the respective roles of each device in the network may differ. There are systems in which communication is performed with devices assuming the role of either a "master" that manages the identification information of other devices and entry into or withdrawal from the network, or a "slave" that operates based on instructions from the master.

Many proposals have been made regarding a method for switching the roles of a master/slave in a system in which communication is performed between a master and a slave (Japanese Published Patent Application 2002-280925, US Published Patent Application 2003-220076, Japanese Published Patent Application 10-155184, US Published Patent Application 2004-203936).

Many proposals have also been made regarding a method for deciding the master from among a plurality of devices constituting a wireless network (US Published Patent Application 2004-43780, US Published Patent Application 2003-157950, US Published Patent Application 2005-86273).

If the network is made up of a plurality of types of devices, the device that is better suited in terms of capability preferably operates as the master. For example, in the case where a device without a display unit is the master, the user will be unable to readily identify accessible devices in the same network.

However, if a device provided with a display unit capable of displaying the devices in the same network is the master, users are able to check which devices are participants in the network. Further, if an operation unit that is able to designate a data transfer destination from among the displayed devices is included, data communication with desired parties can be readily performed.

DISCLOSURE OF INVENTION

An object of the present invention is to provide a communication apparatus, a communication method and a communication system, the communication apparatus being capable of readily becoming a master device, even when entering a network that already has a master device. Further objects of the present invention will become apparent from the following description and drawings.

To resolve the above problems, the present invention provides a communication apparatus that operates in a network as one of a master device and a slave device, the apparatus including a determination unit that determines whether the communication apparatus is to newly become at least one of the master device and the slave device, and a setting unit that sets a standby time until start of an operation for deciding on a new master device, based on the determination by the determination unit.

Also, the present invention provides a control method for a communication apparatus, the method including a determination step of determining whether the communication apparatus is to newly become the master device or the slave device, and a setting step of setting a standby time until start of an operation for deciding on a new master device, based on the result of the determination in the determination step.

Further, the present invention provides a communication system composed of communication apparatuses that operate as a master device or a slave device. The slave device includes a requesting unit that makes a network reconstruction request to the master device, and a setting unit that sets a standby time until start of an operation for deciding on a new master device, based on the response to the request. The master device includes a reception unit that receives the network reconstruction request, and a setting unit that sets a standby time until start of an operation for deciding on a new master device, based on the result of the reception by the reception unit.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 16A, 16B and 16C respectively show the data structure regarding device capability and device capability comparison, and an accessible device list display in a wireless communication apparatus according to the third and fourth embodiments.

BEST MODE FOR CARRYING OUT THE INVENTION

The present invention is described in detail below, describing detailed embodiments of the present invention with reference to the drawings. Note that the claimed invention is not limited to the following embodiments, and that all combinations of the features described in the embodiments are not necessarily essential to resolving the invention.

The following embodiments are described in relation to processing performed in the case of an ad hoc network being configured involving a direct wireless connection between devices. Note that with an ad hoc network in the embodiments, devices operate as the master or a slave.

In the embodiments, the device that constructs a new network becomes the master. Subsequently, the master device manages the MAC (Media Access Control) addresses and the like of other devices existing in the same network. The master device also makes requests to slave devices for transmission of device capability, and slave devices transmit their device capability in accordance with the instructions from the master device. Here, device capability information includes the type of device (printer, digital camera, etc.), the capability of the display unit such as a monitor, and the capability of operation units such as buttons. The master and slaves both periodically perform notification of their respective existence (master declaration and slave declaration).

First Embodiment

Figure 1:
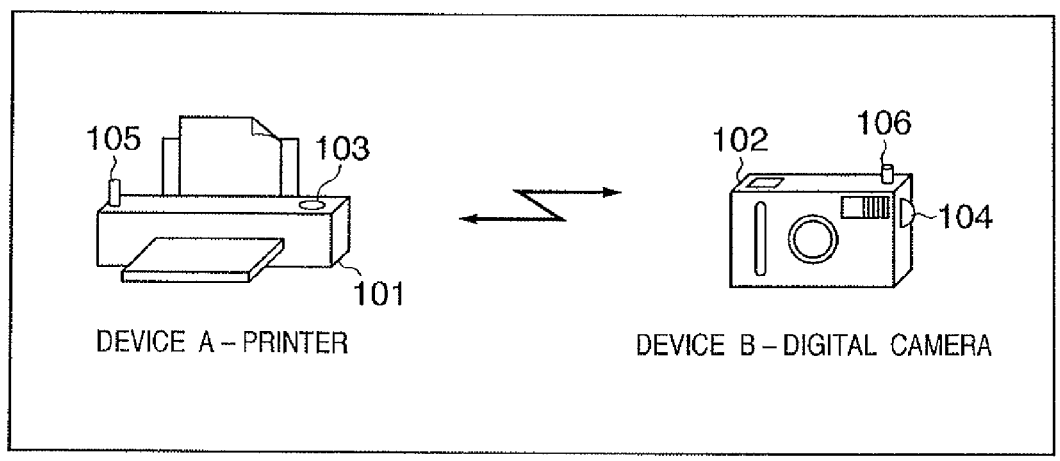
FIG. 1 is a configuration diagram of a communication system according to first and third embodiments.

FIG. 1 shows the configuration of a communication system according to a first embodiment.

101 and 102 are respectively a printer (device A) and a digital camera (device B). The printer 101 has an 802.11 wireless LAN as a wireless communication function 105, and the configuration of an ad hoc network for performing direct communication between devices is possible by pressing a communication setting button 103. The digital camera 102 also has an 802.11 wireless LAN as a wireless communication function 106, and the configuration of an ad hoc network is possible by pressing a communication setting button 104.

Figure 2:
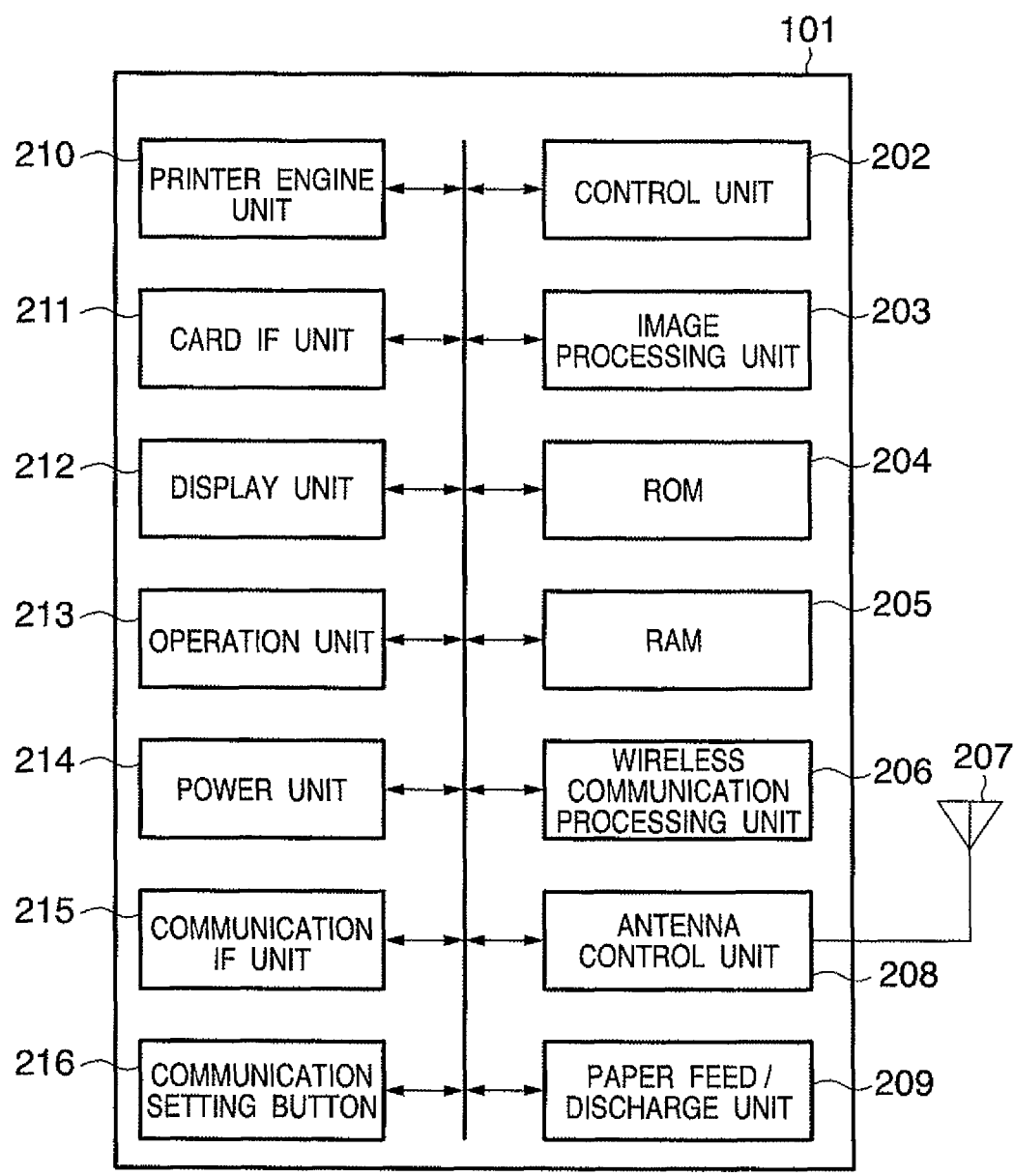
FIG. 2 is a block configuration diagram of a printer according to the embodiments of the present invention.

FIG. 2 shows a block configuration of the printer 101 in the present embodiment.

202 is a control unit for controlling the operation of the entire printer 101. 203 is an image processing unit that administers the encoding, decoding and format conversion of image data. 204 is a ROM (Read Only Memory) that stores programs for the various controls of FIGS. 5, 7, 11, 14 and 20 (described below) performed by the control unit 202, while 205 is a RAM (Random Access Memory). 206 is a wireless communication processing unit for controlling 802.11 wireless LAN communication, 207 is an antenna, and 208 is an antenna control unit. 209 is a paper feed/discharge unit for feeding and discharging printer paper, while 210 is a printer engine unit for controlling printing by the printer 101. 211 is a card interface unit for controlling a recording media card that stores images. 212 is a display unit realized by a CRT, a liquid crystal display or the like. 213 is an operation unit, 214 is a power unit, and 215 is a communication interface unit such as a USB or an IEEE1394. 216 is a communication setting button for starting up an operation to enter the ad hoc network in which direct communication is performed between devices.

Figure 3:
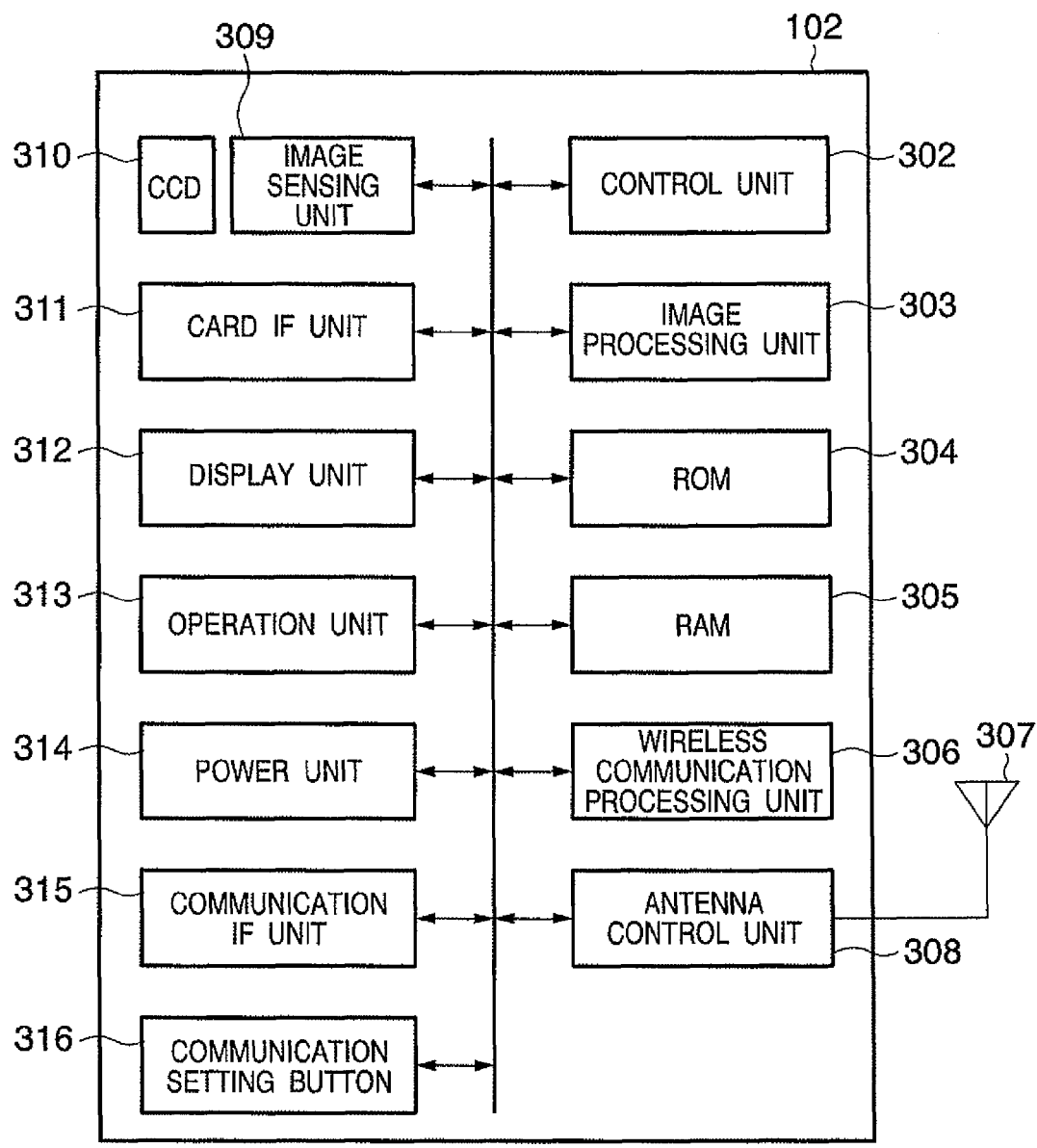
FIG. 3 is a block configuration diagram of a digital camera according to the embodiments of the present invention.

FIG. 3 shows a block configuration of the digital camera 102 in the present embodiment.

In FIG. 3, 302 is a control unit for controlling the operation of the entire digital camera 102. 303 is an image processing unit that administers the encoding, decoding and format conversion of image data. 304 is a ROM storing programs for the various controls of FIGS. 5, 6, 10, 13 and 19 (described below) performed by the control unit 302, while 305 is a RAM. 306 is a wireless communication processing unit for controlling 802.11 wireless LAN communication, 307 is an antenna, and 308 is an antenna control unit. 309 is an image sensing unit that imports pixel signal input from a CCD 310. 311 is a card interface unit for controlling a recording media card that stores sensed images and setting information. 312 is a display unit realized by a CRT, a liquid crystal display or the like. 313 is an operation unit that includes buttons such as image-sensing instruction, play, and setting buttons. 314 is a power unit, while 315 is a communication interface unit such as a USB or an IEEE1394. 316 is a communication setting button for starting up an operation to enter the ad hoc network in which direct communication is performed between devices.

The present embodiment is described in relation to processing performed in the case where the printer 101 initially forms an ad hoc network and is operating as the master, when the digital camera 102 enters the network.

Figure 4:
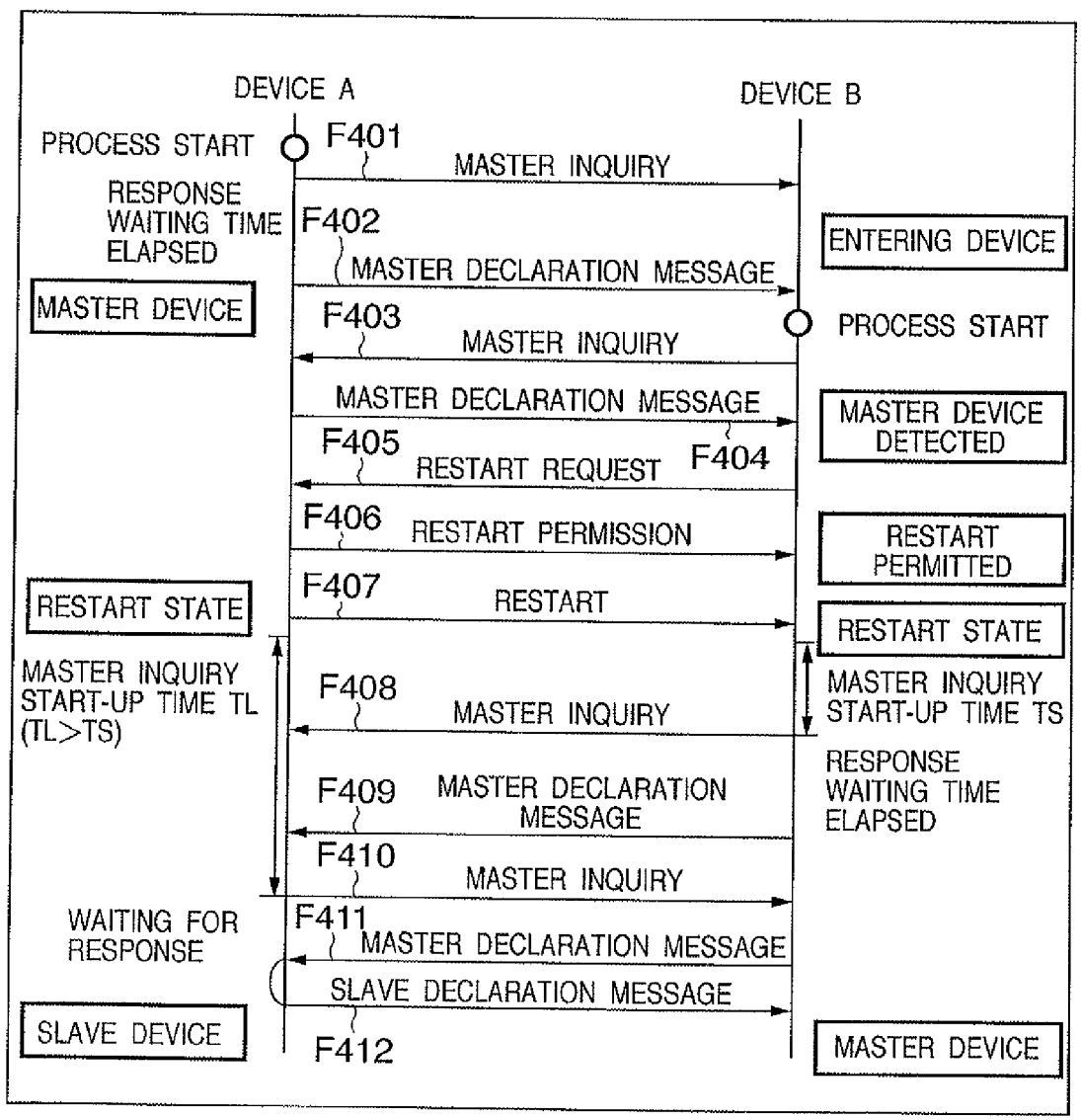
FIG. 4 shows an operation sequence in the first embodiment.

FIG. 4 shows an operation sequence in the first embodiment.

Processing for connecting to an ad hoc network is started when the communication setting button 103 of the device A is pressed, and the device A broadcasts a master inquiry F401.

If a response waiting time elapses without a response to the master inquiry, the device A decides that a master device is not entered in the ad hoc network, and becomes the master device by transmitting a master declaration message F402. The device A also continues to broadcast master declaration messages periodically.

Next, when the process for connecting to the ad hoc network is started by pressing the communication setting button 104 of the device B, the device B broadcasts a master inquiry F403.

Then, on receiving a master declaration message F404 from the device A in response to the master inquiry, the device B detects that a master device exists in the ad hoc network. The device B stores the MAC address of the device A from the source MAC address of the master declaration message F404.

Having detected the master device, the device B transmits a restart request F405 to the MAC address of the device A in order to start a master-slave exchange.

The device A stores the MAC address of the device B from the source MAC address of the received restart request F405. After transmitting a restart permission F406 to the MAC address of the device B, the device A then transmits a restart F407 and transfers to a restart state.

The device B stores the receipt of the restart permission F406, and waits to receive a restart. On receiving the restart F407 from the device A, the device B transfers to a restart state.

Here, the restart state is a state in which the devices are temporarily released from their role as master or slave, and an attempt is made to reconstruct the network. The restart request is a signal requesting transfer to the restart state.

The device A, having transferred to the restart state, sets the master inquiry start-up time to TL, and waits for the TL time to elapse.

The device B, having transferred to the restart state, sets a master inquiry start-up time to TS, and waits for time TS to elapse. Here, the master inquiry start-up time TS is set to a smaller value than the master inquiry start-up time TL. This results in the device B, which transmitted the restart request, transmitting a master inquiry before the device A, which received the restart request.

That is, in each device, the values of TL, which is set by the device that receives a restart request, and TS, which is set by the device that transmits a restart request and receives a restart permission, are prestored in the RAMs 205 and 305. TL and TS are set depending on the situation.

Once the master inquiry start-up time TS elapses, the device B broadcasts a master inquiry F408. If the response waiting time elapses without receiving a master declaration message from another device, the device B broadcasts a master declaration message F409. The device B thereafter operates as the master.

On the other hand, the device A broadcasts a master inquiry F410 when the master inquiry start-up time TL elapses. On receiving a master declaration message F411 from the device B, which is now the master, the device A transmits a slave declaration message F412 to the device B. The device B thereafter operates as a slave.

Figure 5:
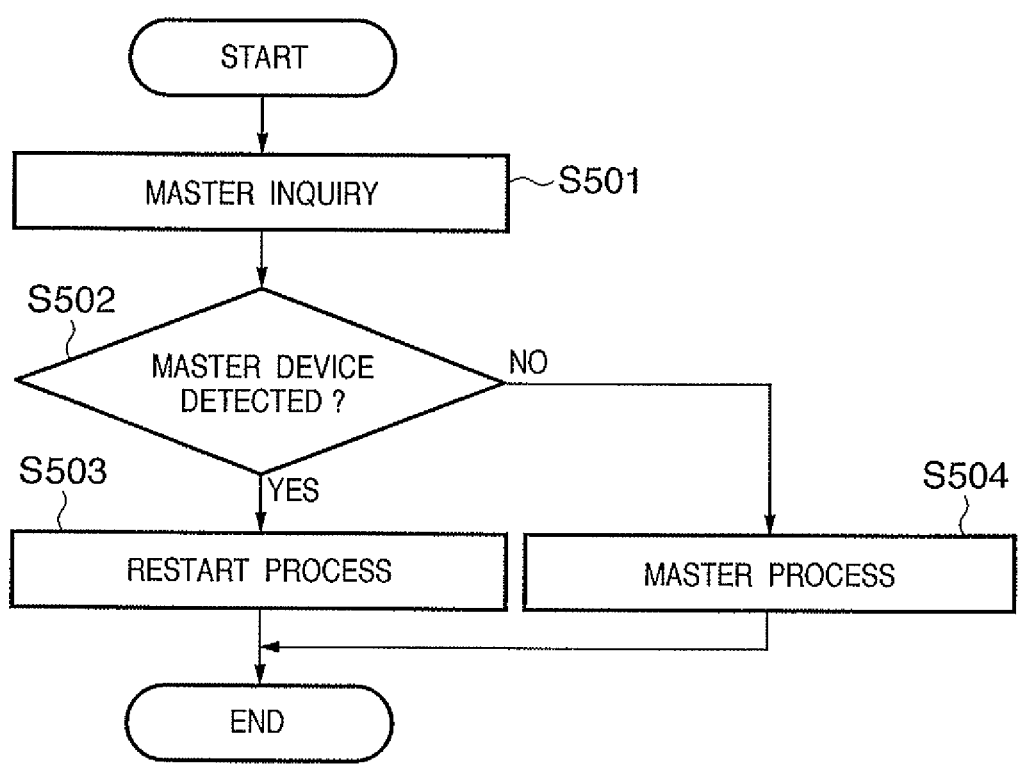
FIG. 5 shows an operation algorithm in the first to fourth embodiments.

FIG. 5 shows an operation algorithm of the devices in the present embodiment.

When the process to connect to an ad hoc network is started by pressing the communication setting button, the device broadcasts a master inquiry (step S501).

The device then determines whether a master declaration message has been received within a response waiting time for the master inquiry (step S502). If a master device is detected by receiving a master declaration message (step S502: YES), the device performs the restart process (step S503). The restart process is described in detail below with reference to FIG. 6. If the response waiting time elapses without receiving a master declaration message, the device decides that a master device has not been detected (step S502: NO), and performs master process (step S504). The master process is described in detail below with reference to FIG. 7.

Figure 6:
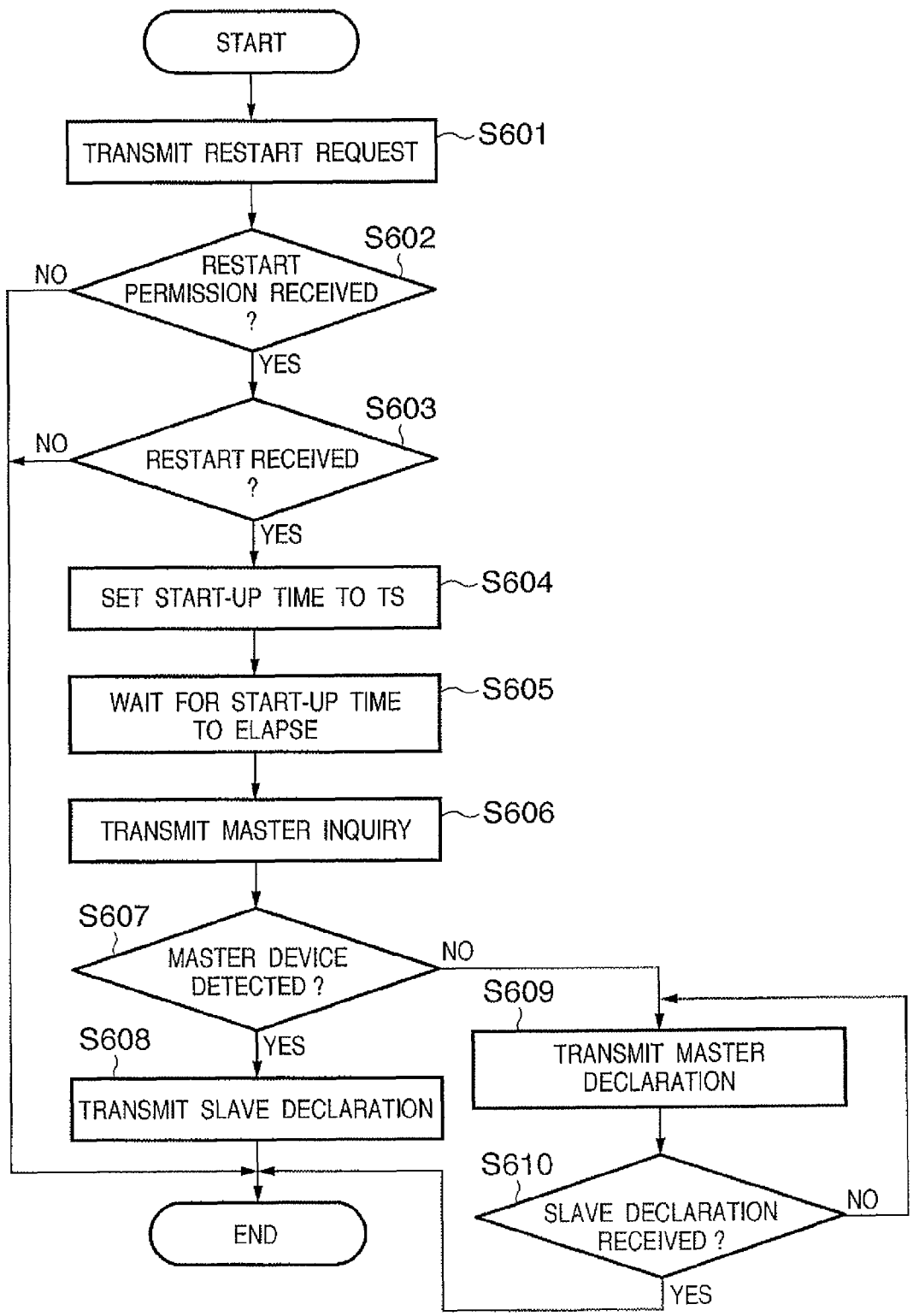
FIG. 6 shows an operation algorithm of the restart process of FIG. 5 in the first embodiment.

FIG. 6 shows an operation algorithm of the restart process (S503) in the flowchart of FIG. 5.

The device starting the restart process first transmits a restart request to the master device (step S601). This corresponds to transmission of the restart request F405 in FIG. 4.

At step S602, the device determines whether a restart permission from the master device has been received. If a restart permission has been received (step S602: YES), the device stores the restart permission receipt and proceeds to step S603. If a restart permission has not been received (step S602: NO), the device ends the process.

At step S603, the device determines whether a restart from the master device has been received. If a restart has been received (step S603: YES), the device proceeds to step S604, and if a restart has not been received (step S603: NO), the device ends the process.

At step S604, the device sets the master inquiry start-up time to TS. The device then waits for the master inquiry start-up time TS to elapse (step S605).

Once the master inquiry start-up time TS elapses, the device broadcasts a master inquiry (step S606). This corresponds to transmission of the master inquiry F408 in FIG. 4.

At step S607, the device determines whether a master declaration message has been received within the response waiting time for the master inquiry. If a master device is detected by receiving a master declaration message (step S607: YES), the device proceeds to step S608. If a master device is not detected (step S607: NO), the device proceeds to step S609.

At step S608, the device transmits a slave declaration message to the master device. Note that the MAC address of the master device can be stored by looking at the source MAC address of the master declaration message.

At step S609, the device itself becomes the master device and transmits a master declaration message, since a master device was not detected. This corresponds to transmission of the master declaration message F409 in FIG. 4.

Then, the device determines whether a slave declaration message has been received within the response time for the master declaration message (step S610). If a slave declaration message has been received (step S610: YES), the device ends the process. If a slave declaration message has not been received (step S610: NO), the device returns to step S609 and again transmits a master declaration message.

Figure 7:
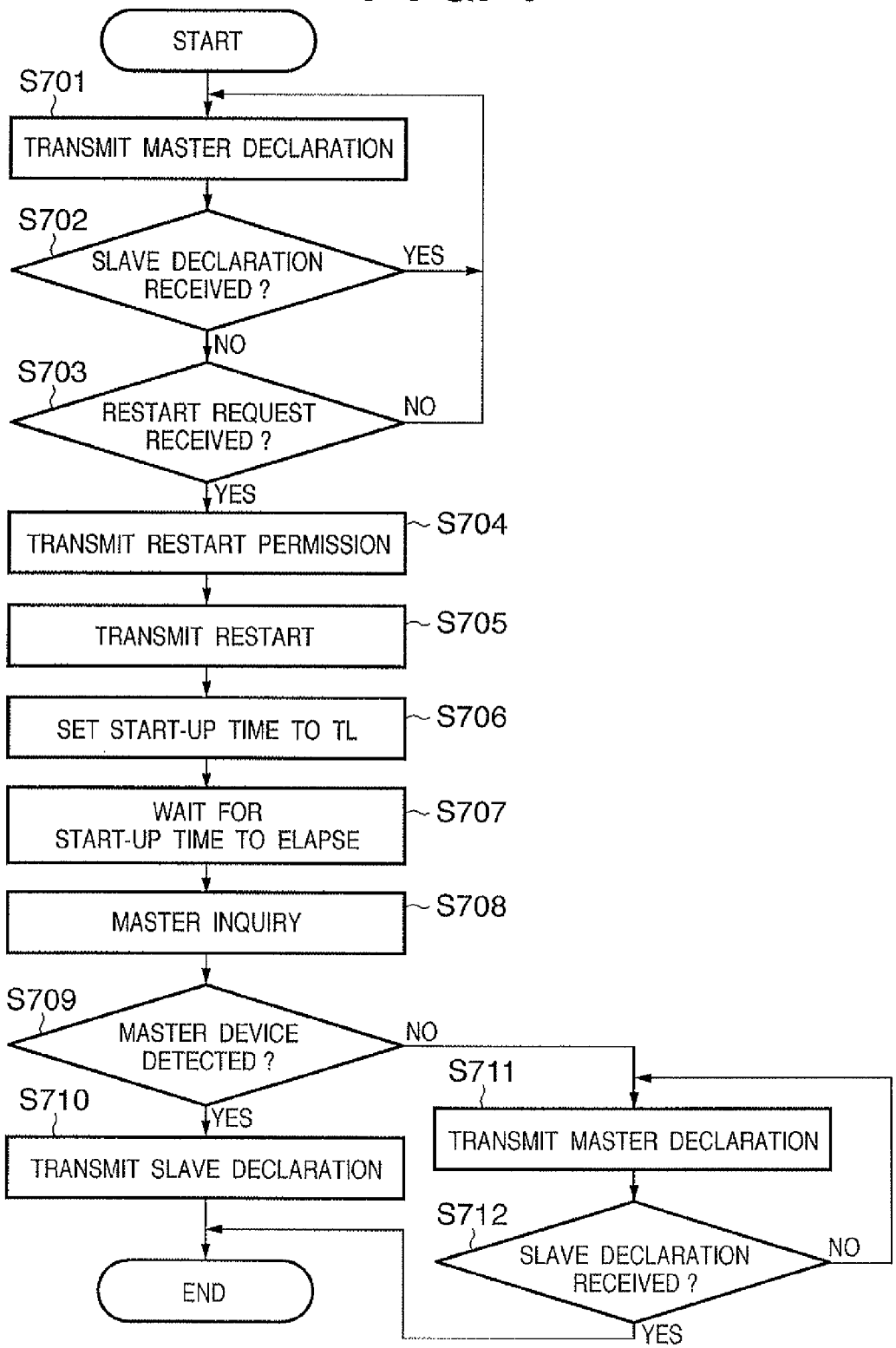
FIG. 7 shows an operation algorithm of the master process of FIG. 5 in the first embodiment.

FIG. 7 shows an operation algorithm of the master process (S504) in the flowchart of FIG. 5.

The device that starts the master process transmits a master declaration message (step S701). This corresponds to the master declaration message F402 in FIG. 4.

Then, the device checks whether a slave declaration message has been received (step S702). If a slave declaration message has been received (step S701: YES), the device returns to step S701 and again transmits a master declaration message. If a slave declaration message has not been received (step S701: NO), the device proceeds to step S703, and if a slave declaration has been received (step S702: YES), the device returns to step S701.

At step S703, the device checks whether a restart request has been received, and if a restart request has been received (step S703: YES), the device proceeds to step S704. If a restart request has not been received (step S703: NO), the device returns to step S701 and again transmits a master declaration message. At step S704, the device transmits a restart permission to the source MAC address of the restart request as the transmission destination. This corresponds to transmission of the restart permission F406 in FIG. 4.

Next, at step S705, the device transmits a restart to the source MAC address of the restart request as the transmission destination. This corresponds to transmission of the restart F407 in FIG. 4.

After transmitting the restart, the device sets the master inquiry start-up time to TL (step S706). Then, after waiting for the master inquiry start-up time TL to elapse (step S707), the device broadcasts a master inquiry (step S708). This corresponds to transmission of the master inquiry F410 in FIG. 4.

At step S709, the device checks whether a master declaration message has been received within the response waiting time for the master inquiry. If a master device is detected by receipt of a master declaration message (step S709: YES), the device transmits a slave declaration message to the master device (step S710). This corresponds to transmission of the slave declaration message F412 in FIG. 4. If a master device is not detected (step S709: NO), the device proceeds to step S711, and transmits a master declaration message to itself to become the master device. Next, the device determines whether a slave declaration message has been received within the response time of the master declaration message (step S712). If a slave declaration message has been received (step S712: YES), the device ends the process. If a slave declaration message has not been received (step S712: NO), the device returns to step S711 and again transmits a master declaration message.

Note that although the present invention has been described in terms of a device newly entering the network always making a restart request when a master device is detected, whether or not a restart request is made may be preset depending on the device. For example, a digital camera may be set to transmit a restart request upon detecting a master device, while a printer may be set to not transmit a restart request even upon detecting a master device. This makes it possible to exchange master and slave devices only when a device that is predetermined to be suitable as the master device is entered in the network.

In the present embodiment, the device newly entering the network transmits a restart request to a device already operating as the master device, and if a restart permission is received, the device transfers to the restart state and transmits a master inquiry before the master device can do so. This enables a device newly entering a network to operate as the master even if a master device already exists in the network.

Second Embodiment

Figure 8:
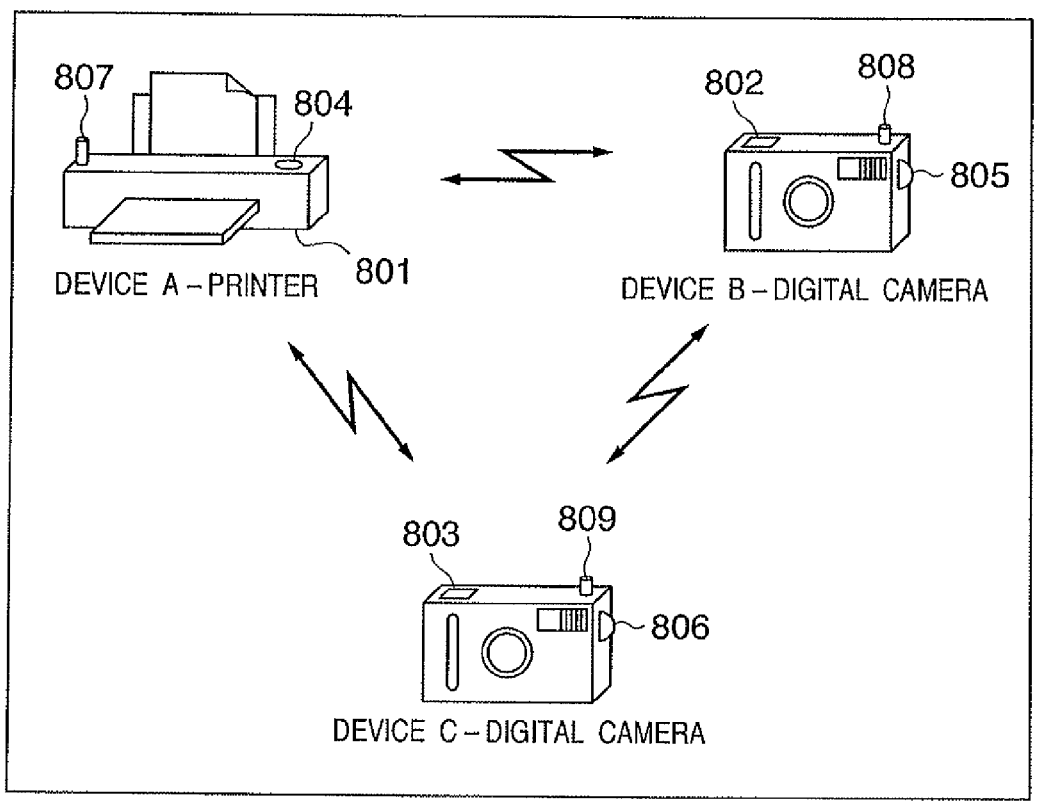
FIG. 8 is a configuration diagram of a communication system according to the second and fourth embodiments.

FIG. 8 shows the configuration of a communication system according to a second embodiment.

In FIGS. 8, 801, 802 and 803 refer respectively to a printer 801 (device A), a digital camera 802 (device B) and a digital camera 803 (device C). These devices constituting an ad hoc network. The devices are each provided with 802.11 wireless LAN by way of wireless communication functions 807, 808 and 809, respectively. Connection to the ad hoc network is possible by pressing communication setting buttons 804, 805 and 806. Note that descriptions of the block configurations of the devices, being the same as FIGS. 2 and 3 in embodiment 1, are omitted here.

Figure 9:
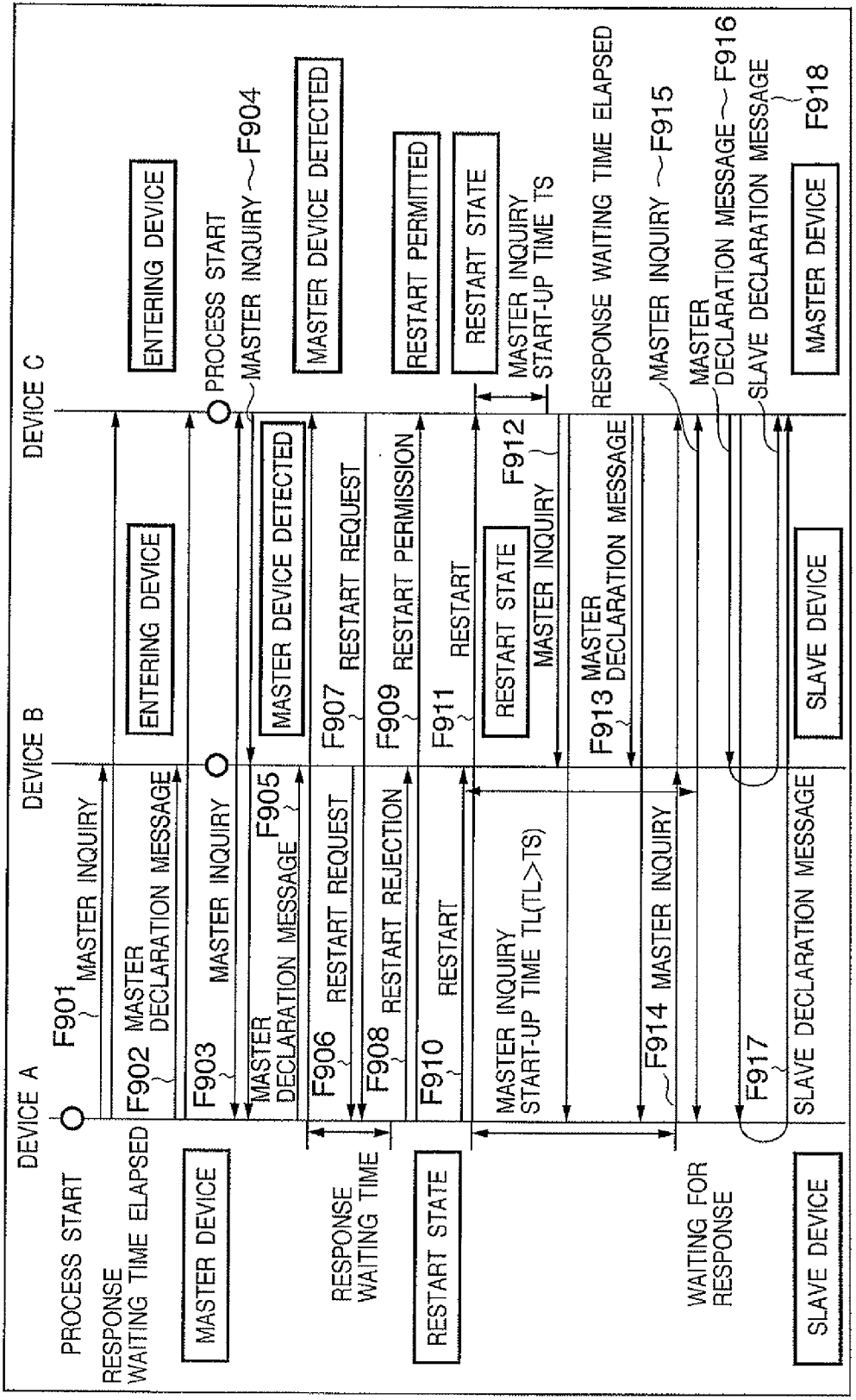
FIG. 9 shows an operation sequence in the second embodiment.

FIG. 9 shows an operation sequence in the second embodiment.

Processing in order to connect to an ad hoc network is started when the communication setting button 804 of the device A is pressed, and the device A broadcasts a master inquiry F901.

If the response waiting time elapses without a response to the master inquiry, the device A decides that a master device is not entered in the ad hoc network, and becomes the master device by transmitting a master declaration message F902. The device A also continues to broadcast master declaration messages periodically.

Then, when processing in order to connect to the ad hoc network is started by pressing the communication setting button 805 of the device B, the device B broadcasts a master inquiry F903.

Also, when processing in order to connect to the ad hoc network is started by pressing the communication setting button 806 of the device C, the device C broadcasts a master inquiry F904.

On receiving a master declaration message F905 from the device A in response to the master inquiries, the devices B and C detect that a master device exists in the ad hoc network. The devices B and C then respectively transmit restart requests F906 and F907 to the device A in order to start a master-slave exchange.

Here, it is assumed that the device A received the restart requests F906 and F907 from the devices B and C within the response waiting time until the next master declaration message after the transmission of the master declaration message F905.

The device A stores the MAC addresses of the devices B and C from the source MAC addresses of the received restart requests F906 and F907. The device A then transmits a restart rejection F908 to the device B, and a restart permission F909 to the device C. Next, the device A transmits restarts F910 and F911 to the devices B and C, and transfers to the restart state.

Note that the decision as to whether to transmit a restart rejection or a restart permission is made in accordance with specific determination criteria. For example, one method involves transmitting a restart permission to the source device of the first restart request to be received, while another method involves referring to the lexicographic order of the MAC addresses of the source devices, and transmitting a restart permission to the device with the highest value.

On receiving restarts F910 and F911, respectively, the devices B and C transfer to the restart state.

The device A, having transferred to the restart state, sets the master inquiry start-up time to TL, and waits for the TL time to elapse.

The device B, having transferred to the restart state, sets the master inquiry start-up time to TL since a restart permission was not received, and waits for the TL time to elapse.

The device C, having transferred to the restart state, sets the master inquiry start-up time to TS upon storing the received restart permission, and waits for the TS time to elapse. Here, the master inquiry start-up time TL is set to be longer than the master inquiry start-up time TS. This results in the device C, which received the restart permission, being the first to transmit a master inquiry.

That is, the values of TL and TS are stored in each device. TL values are set by the device when it receives a restart request or it transmits a restart request and receives a restart rejection. TS values are set by the device when it transmits a restart request and receives a restart permission. TS and TL values are prestored in the RAMs 205 and 305. TL and TS are set depending on the situation.

The device C broadcasts a master inquiry F912, and if the response waiting time elapses without receiving a master declaration message from another device, the device C broadcasts a master declaration message F913 and becomes the master device.

On the other hand, the devices A and B broadcast master inquires F914 and 915 after the elapse of the master inquiry start-up time TL. The device C, which has already become the master device, transmits a master declaration message F916 in response to the master inquires. The devices A and B, having received the master declaration message, transmit slave declaration messages F917 and F918 to the device C, and become slave devices.

The operation algorithm of the devices in the present embodiment is the same as the flowchart shown in FIG. 5 of the first embodiment, except for the restart process (S503) and the master process (S504).

Figure 10:
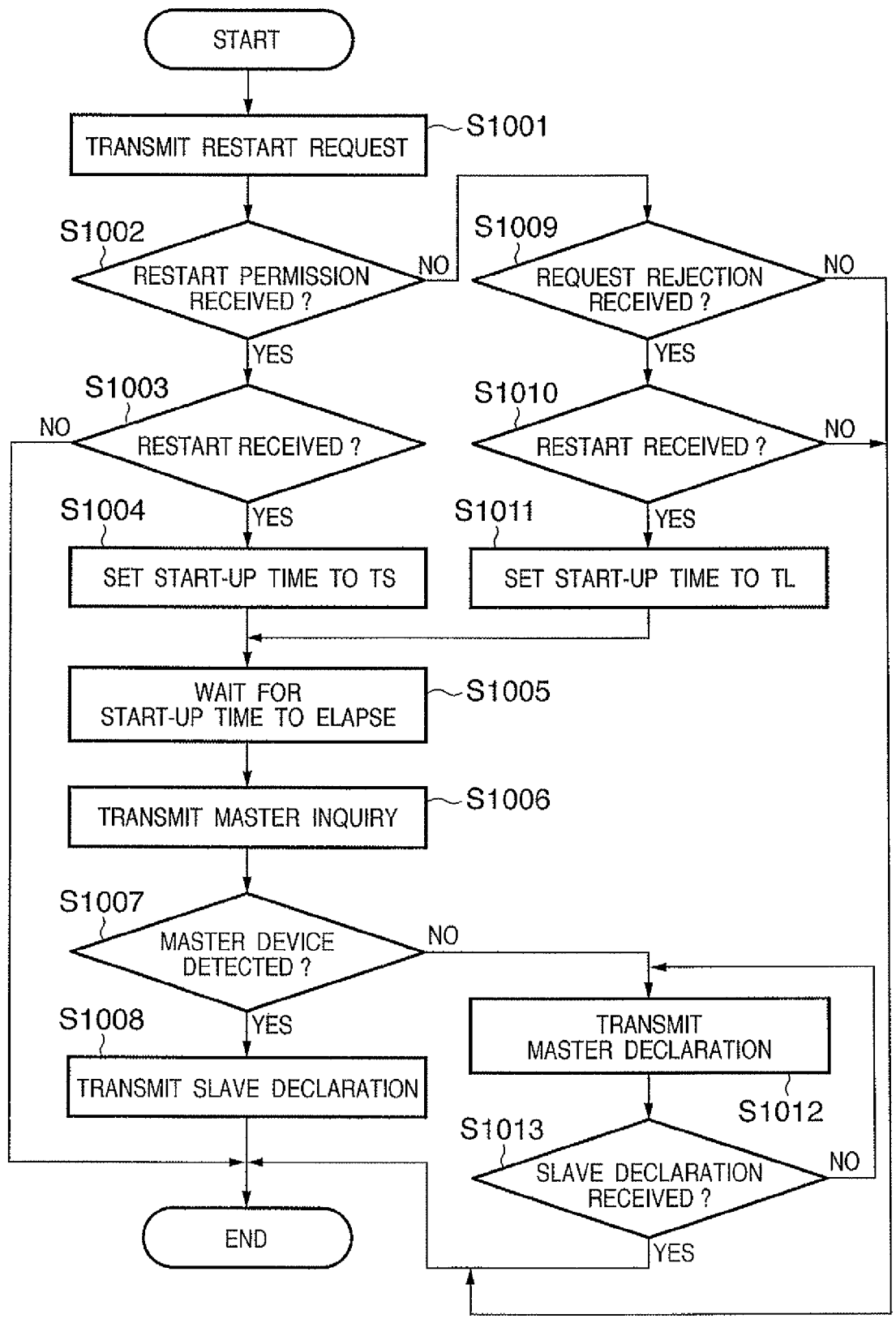
FIG. 10 shows an operation algorithm of the restart process of FIG. 5 in the second embodiment.

The operation algorithm of the restart process (S503 in FIG. 5) in the present embodiment is described in FIG. 10.

The device starting the restart process transmits a restart request to the master device (step S1001). This corresponds to transmission of the restart request F906 or F907 in FIG. 9.

At step S1002, the device determines whether a restart permission from the master device has been received. If a restart permission has been received (step S1002: YES), the device stores the receipt of restart permission and proceeds to step S1003, and if a restart permission has not been received (step S1002: NO), the device proceeds to step S1009.

At step S1003, the device determines whether a restart from the master device has been received. If a restart has been received (step S1003: YES), the device proceeds to step S1004, and if a restart has not been received (step S1003: NO), the device ends the process.

At step S1004, the device sets the master inquiry start-up time to TS. The device then waits for the master inquiry start-up time TS to elapse (step S1005).

When the master inquiry start-up time TS elapses, the device broadcasts a master inquiry (step S1006). This corresponds to transmission of the master inquiry F912 in FIG. 9.

At step S1007, the device checks whether a master declaration message has been received within the response waiting time for the master inquiry. If a master device is detected by receiving a master declaration message (step S1007: YES), the device proceeds to step S1008. If a master device is not detected (step S1007: NO), the device proceeds to step S1012.

At step S1008, the device transmits a slave declaration message to the master device. Note that the MAC address of the master device can be stored by looking at the source MAC address of the master declaration message.

At step S1009, the device determines whether a request rejection has been received from the master device. If a request rejection has been received (step S1009: YES), the device proceeds to step S1010, and if a request rejection has not been received (step S1009: YES), the device ends the process.

At step S1010, the device determines whether a restart from the master device has been received. If a restart has been received (step S1010: YES), the device proceeds to step S1011, and if a request start has not been received (step S1010: YES), the device ends the process.

At step S1011, the device sets the master inquiry start-up time to TL, and proceeds to step S1005.

At step S1012, the device itself becomes the master device and broadcasts a master declaration message. This corresponds to transmission of the master declaration message F913 in FIG. 9.

At step S1013, the device determines whether a slave declaration message has been received within the response time for the master determination. If a slave declaration message has been received (step S1013: YES), the device ends the process, and if a slave declaration message has not been received (step S1013: NO), the device returns to step S1012 and again transmits a master declaration message.

Thus, in the present embodiment, among the devices that have transmitted the restart request, the device that receives the restart permission is the first to transmit a master inquiry since the master inquiry start-up time of this device is set to a smaller value than the device that did not receive the restart permission.

Figure 11:
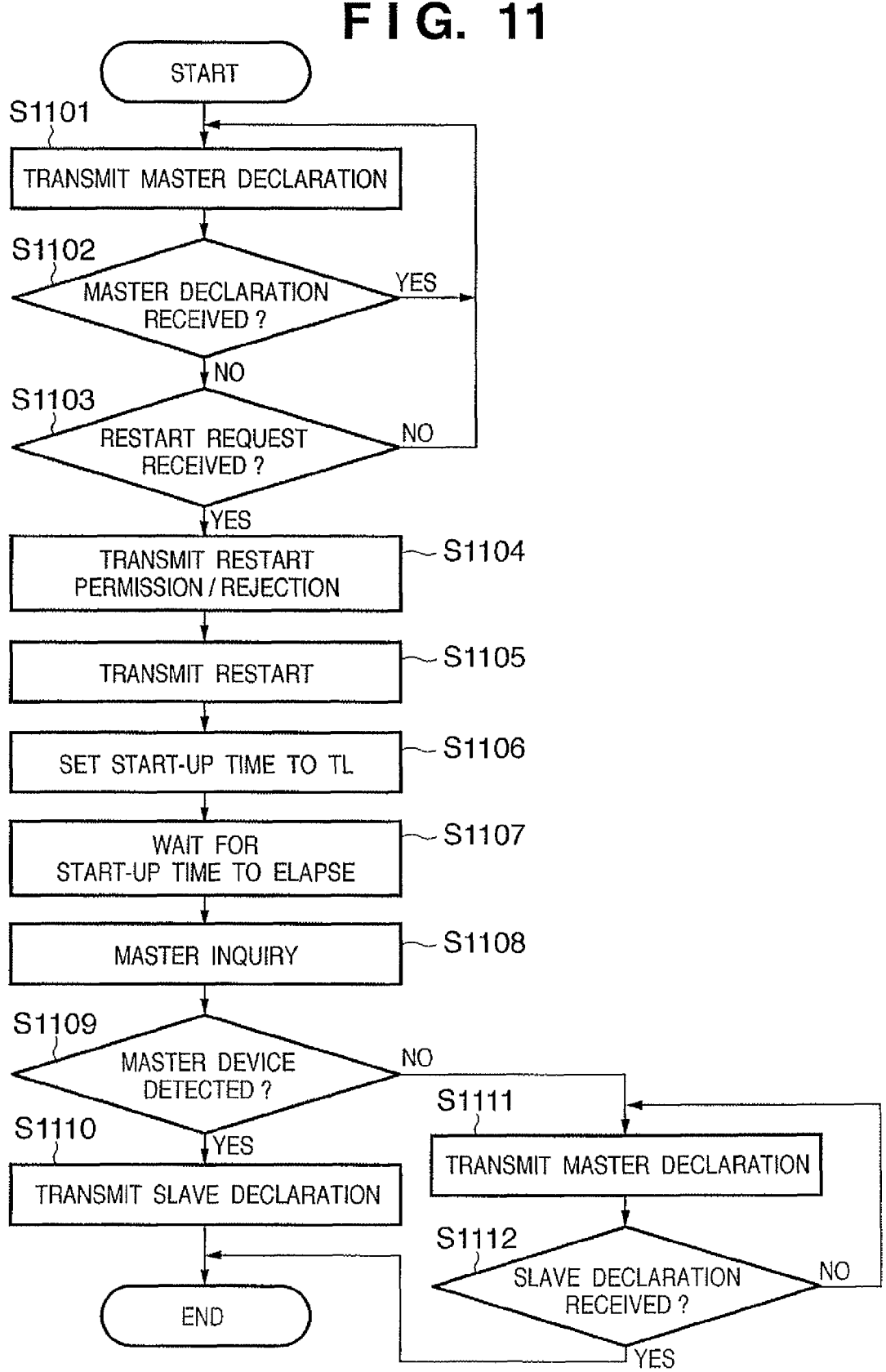
FIG. 11 shows an operation algorithm of the master process of FIG. 5 in the second embodiment.

FIG. 11 shows an operation algorithm of the master process (S504 in FIG. 5) in the present embodiment. Note that S1101 to S1103 and S1105 to S1112 in the flowchart of FIG. 11 are the same as S701 to 3703, and S705 to S712 in the flowchart of FIG. 7 in the first embodiment, while the process of S1104 is different from that of S704.

At step S1104, the device, rather than transmitting a restart permission to all the devices that have transmitted a restart request, transmits a restart rejection or a restart permission to each device.

Thus, out of a plurality of devices that transmit a restart request, restart permission is only transmitted to the device that is to newly become the master device.

Note that although the present embodiment has been described above in terms of a device newly entering the network always making a restart request when a master device is detected, whether or not a restart request is made may be preset depending on the device. For example, a digital camera is set to transmit a restart request upon detecting a master device, while a printer is set to not transmit a restart request even upon detecting a master device. As a result, a master device and slave device can be exchanged only when a device that is predetermined to be suitable as a master device is entered in the network.

According to the present embodiment, in the case where restart requests are made to the master device by a plurality of devices, a restart permission is only transmitted to the device that is to newly become the master device. The device that receives a restart permission is able to newly become the master device after transmitting a master inquiry before the previous master device and the device that received the restart rejection.

Note that although in the present embodiment a restart rejection is transmitted to devices that transmit a restart request other than the device that is to become the new master, it is not absolutely necessary to transmit a restart rejection. For example, similar effects can be obtained by setting the master inquiry start-up time to TL in the case where a device that transmits a restart request receives a restart without receiving a restart permission.

Third Embodiment

The configuration of a communication system according to a third embodiment is the same as the configuration of the communication system shown in FIG. 1 in the first embodiment.

Figure 12:
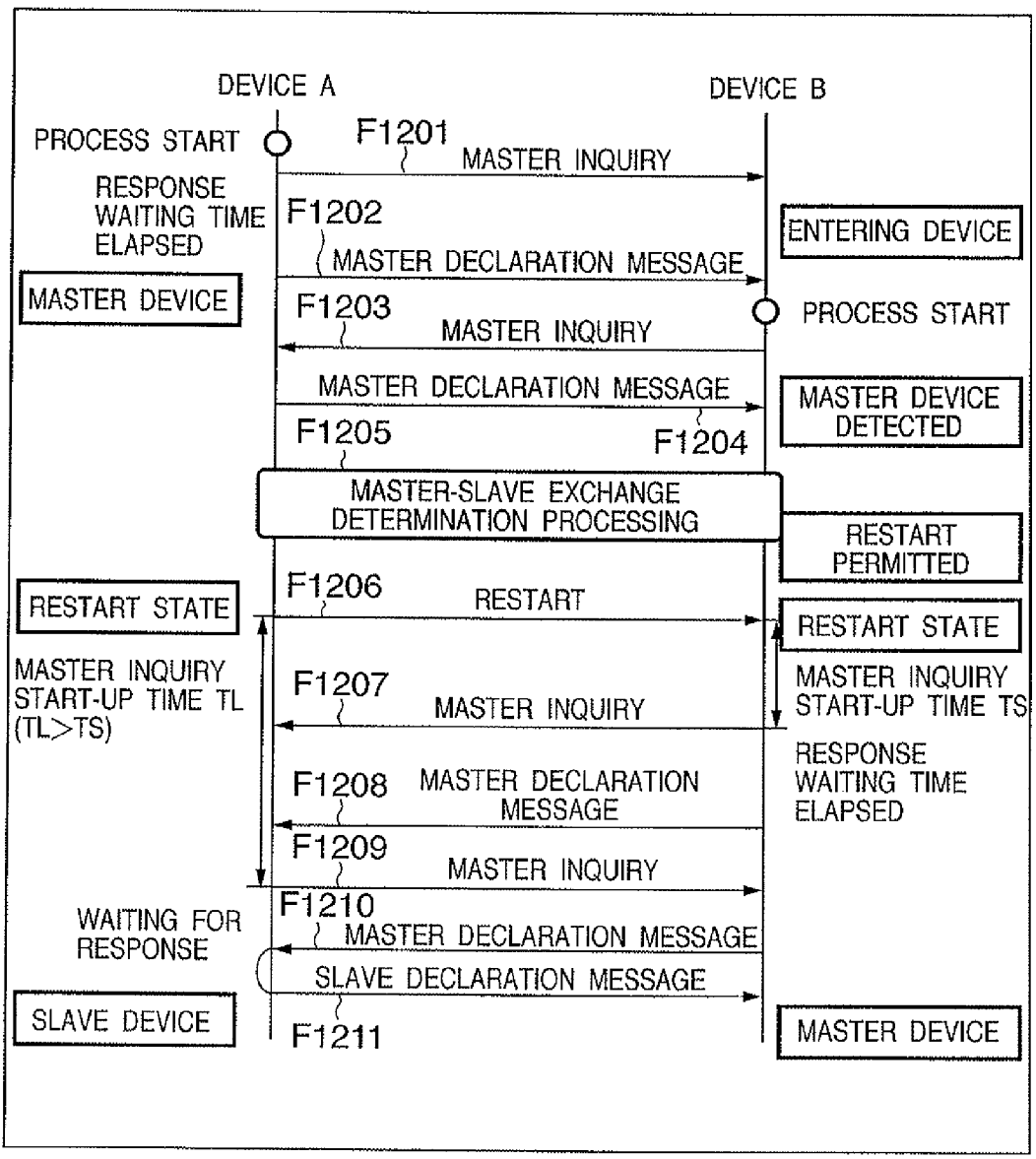
FIG. 12 shows an operation sequence in the third embodiment.

FIG. 12 shows an operation sequence in the present embodiment.

Process for connecting to an ad hoc network is started when the communication setting button 103 of the device A is pressed, and the device A broadcasts a master inquiry F1201.

If a response waiting time elapses without a response to the master inquiry, the device A decides that a master device is not entered in the ad hoc network, and becomes the master device by transmitting a master declaration message F1202. The device A also continues to broadcast master declaration messages periodically.

Next, when process for connecting to the ad hoc network is started by pressing the communication setting button 104 of the device B, the device B broadcasts a master inquiry F1203.

Then, on receiving a master declaration message F1204 from the device A in response to the master inquiry, the device B detects that a master device exists in the ad hoc network.

Figure 15:
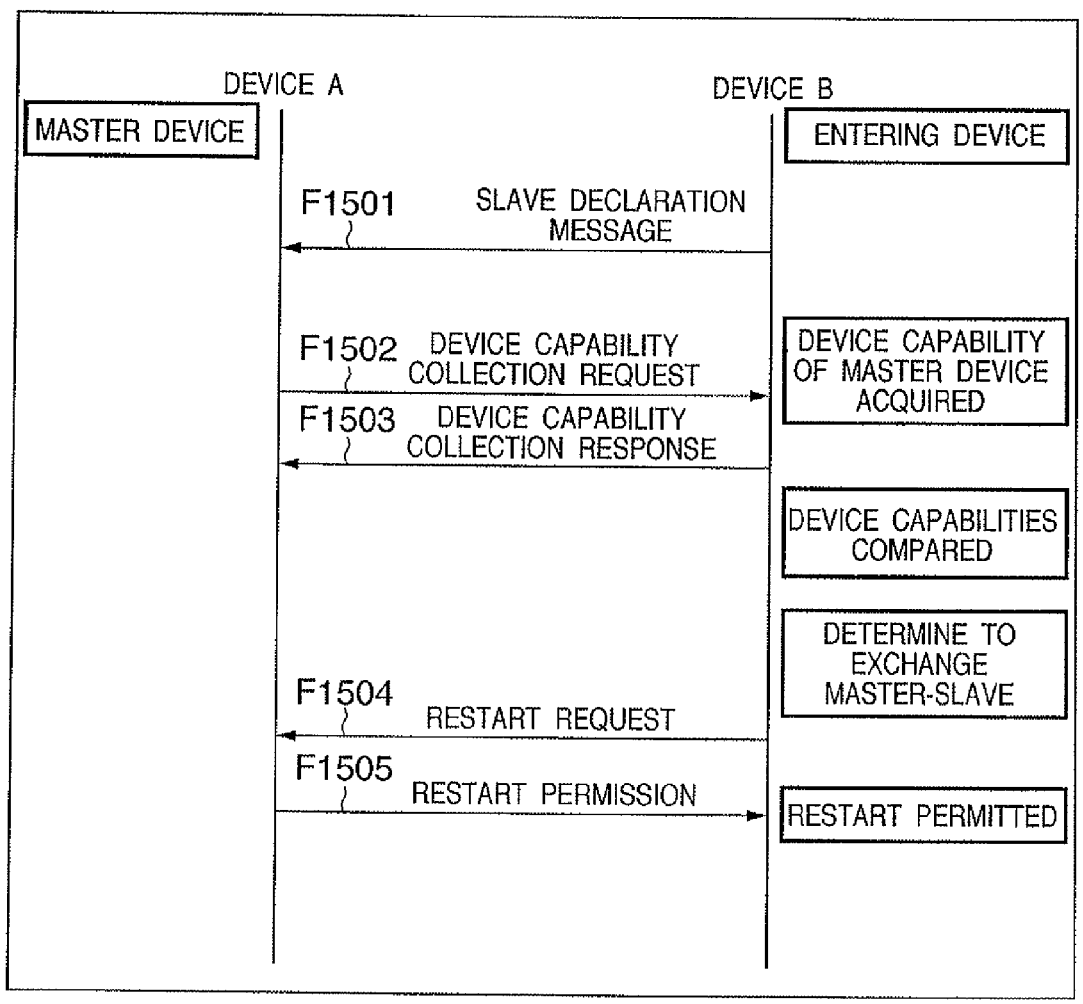
FIG. 15 shows an operation sequence of the master-slave exchange determination process in FIG. 12.

The master-slave exchange determination process F1205 is then started. The master-slave exchange determination process is described with reference to FIG. 15.

The device B, having detected that a master device exists in the ad hoc network, transmits a slave declaration message F1501 (FIG. 15) to the master (device A).

The device A, having received the slave declaration message, transmits a device capability collection request F1502 to the device B. Note that the device A also includes its own device capability in the transmitted device capability collection request.

The device B acquires the device capability of the master device included in the received device capability collection request. The device B transmits its own device capability to the device A as a device capability collection response F1503. Note that the device capability collection response F1503 need not be returned since the comparison of device capabilities is performed in the device B, as described below.

Here, the device B compares the device capability of the device A with its own device capability, and decides which device is better suited to be master.

FIGS. 16A to 16C show the data structure of a device capability and a device capability comparison, and an accessible device list displayed on a display unit.

An exemplary data structure of the device capability collection request F1502 and the device capability collection response F1503 is shown in 1601 of FIG. 16A.

The message type is written following the destination MAC address and the source MAC address. The message type stores a value showing either device capability collection request or device capability collection response. Device capability data is written in the form of a list of device capability attribute values. In the example shown in the data structure 1601, the device capability attribute consists of four items.

An exemplary data structure of a device capability comparison is shown in 1602 of FIG. 16B. In 1602 the MAC addresses and device capability attribute values of devices are enumerated to enable a comparison of the master device and the home device.

Here device ID, device type, display unit capability and operation unit capability are shown as device capability attributes. Which device is better suited as the master device is decided by comparing this information.

For example, after comparing user interface capabilities, it is decided that the digital camera with the high-performance display unit that can display images and the high-performance operation unit that has lots of keys and buttons is better suited as the master device. Note that the device may perform this decision automatically according to prescribed decision criteria or a user instruction.

The digital camera that newly becomes the master device is able to display device types and device IDs as an accessible device list on the display unit 312. An exemplary accessible device list displayed on the display unit 312 of the digital camera is shown in 1603 of FIG. 16C. This enables the user to find out the devices that are entered in the network, and also to select a destination device using the user interface when transferring data.

In this way, the device B transmits a restart request F1504 to the device A in the case where master device and slave device are to be exchanged as a result of comparing the device capabilities. The device A, having received the restart request, transmits a restart permission F1505 to the device B. On receipt of the restart permission F1505, the device B stores the receipt of restart permission, and waits to receive a restart.

Returning to the description of FIG. 12, the device A transmits a restart S1206 to the device B, and transfers to the restart state. On receiving the restart, the device B transfers to the restart state.

The device A, having transferred to the restart state, sets the master inquiry start-up time to TL, and waits for the TL time to elapse.

The device B, having transferred to the restart state, sets the master inquiry start-up time to TS after the receipt of restart permission is stored, and waits for the TS time to elapse. Here, the master inquiry start-up time TS is set to a smaller value than the master inquiry start-up time TL. This results in the device B, which is to newly become the master device, transmitting a master inquiry before the device A.

That is, in each device, the values of TL, which are set by the device receiving a restart request, and TS, which is set by the device transmitting a restart request and receiving a restart permission, are prestored in the RAMs 205 and 305. TL and TS are set depending on the situation.

Once the master inquiry start-up time TS elapses, the device B broadcasts a master inquiry F1207. If the response waiting time elapses without receiving a master declaration message from another device, the device B broadcasts a master declaration message F1208. The device B thereafter operates as master.

On the other hand, the device A broadcasts a master inquiry F1209 when the master inquiry start-up time TL elapses. On receiving a master declaration message F1210 from the device B which is now the master device, the device A transmits a slave declaration message F1211 to the device B. The device B thereafter operates as a slave device.

In this way, the roles of master device and slave device are exchanged between the device A and the device B.

The operation algorithm of the devices in the present embodiment is the same as the flowchart shown in FIG. 5 of the first embodiment, except for the operations involved in the restart process (S503) and the master process (S504).

Figure 13:
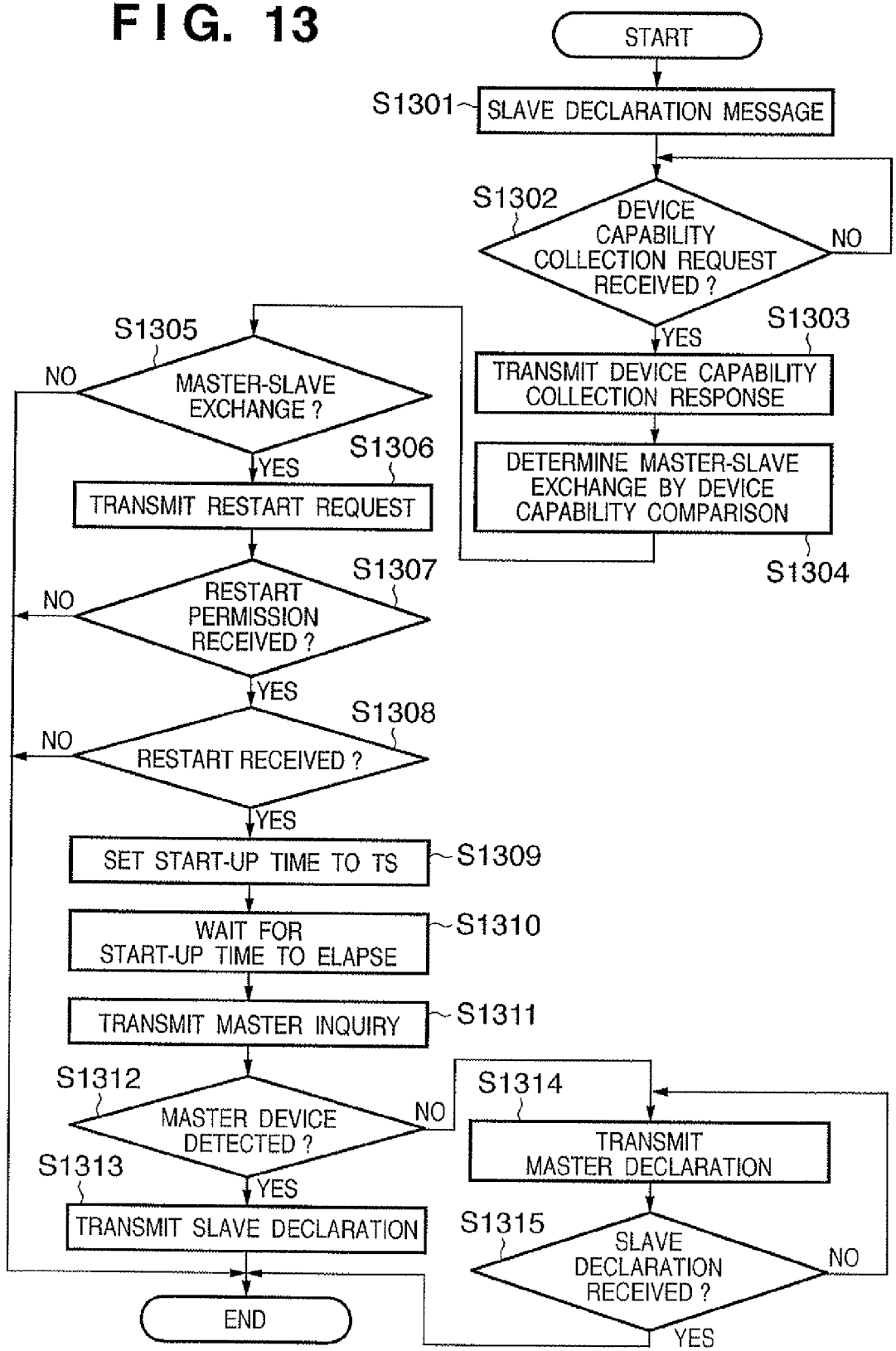
FIG. 13 shows an operation algorithm of the restart process of FIG. 5 in the third embodiment.

The operation algorithm of the restart process (S503 in FIG. 5) in the present embodiment is described using FIG. 13.

First, at step S1301, the device transmits a slave declaration message to the master device. This corresponds to transmission of the slave declaration message F1501 in FIG. 15.

At step S1302, the device determines whether a device capability collection request has been received from the master device. If a device capability collection request has been received (step S1302: YES), the device proceeds to step S1303, and if a device capability collection request has not been received (step S1302: NO), the device continues to wait for receipt.

At step S1303, the device transmits a device capability collection response to the master device. This corresponds to transmission of the device capability collection response F1503 in FIG. 15.

At step S1304, the device compares the device capabilities as shown in FIGS. 16A to 16C, and determines whether to carry out master-slave exchange. If a master-slave exchange will be performed (step S1305: YES), the device proceeds to step S1306, and if a master-slave exchange will not be performed (step S1306: NO), the device ends the process.

At step S1306, the device transmits a restart request to the master device. This corresponds to transmission of the restart request F1504 in FIG. 15.

At step S1307, the device determines whether a restart permission has been received from the master device. If a restart permission has been received (step S1307: YES), the device proceeds to step S1308. If a restart permission has not been received (step S1307: NO), the device ends the process.

At step S1308, the device determines whether a restart has been received. If a restart has been received (step S1308: YES), the device proceeds to step S1309, and sets the master inquiry start-up time to TS. If a restart has not been received (step S1308: NO), the device ends the process.

At step S1310, the device waits for the master inquiry start-up time TS to elapse. When the master inquiry start-up time TS elapses, the device broadcasts a master inquiry (step S1311). This corresponds to transmission of the master inquiry F1207 in FIG. 12.

At step S1312, the device checks whether a master declaration message has been received within the response waiting time for the master inquiry. If a master device is detected by receiving a master declaration message (step S1312: YES), the device proceeds to step S1313, and if a master device is not detected (step S1312: NO), the device proceeds to step S1314.

At step S1313, the device transmits a slave declaration message to the master device.

At step S1314, the device itself becomes the master device and transmits a master declaration message, since a master device was not detected. This corresponds to transmission of the master declaration message F1208 in FIG. 12.

At step S1315, the device determines whether a slave declaration message has been received within the response time for the master declaration. If a slave declaration message has been received (step S1315: YES), the device ends the process. If a slave declaration message has not been received (step S1315: NO), the device returns to step S1314 and periodically transmits master declaration messages.

Figure 14:
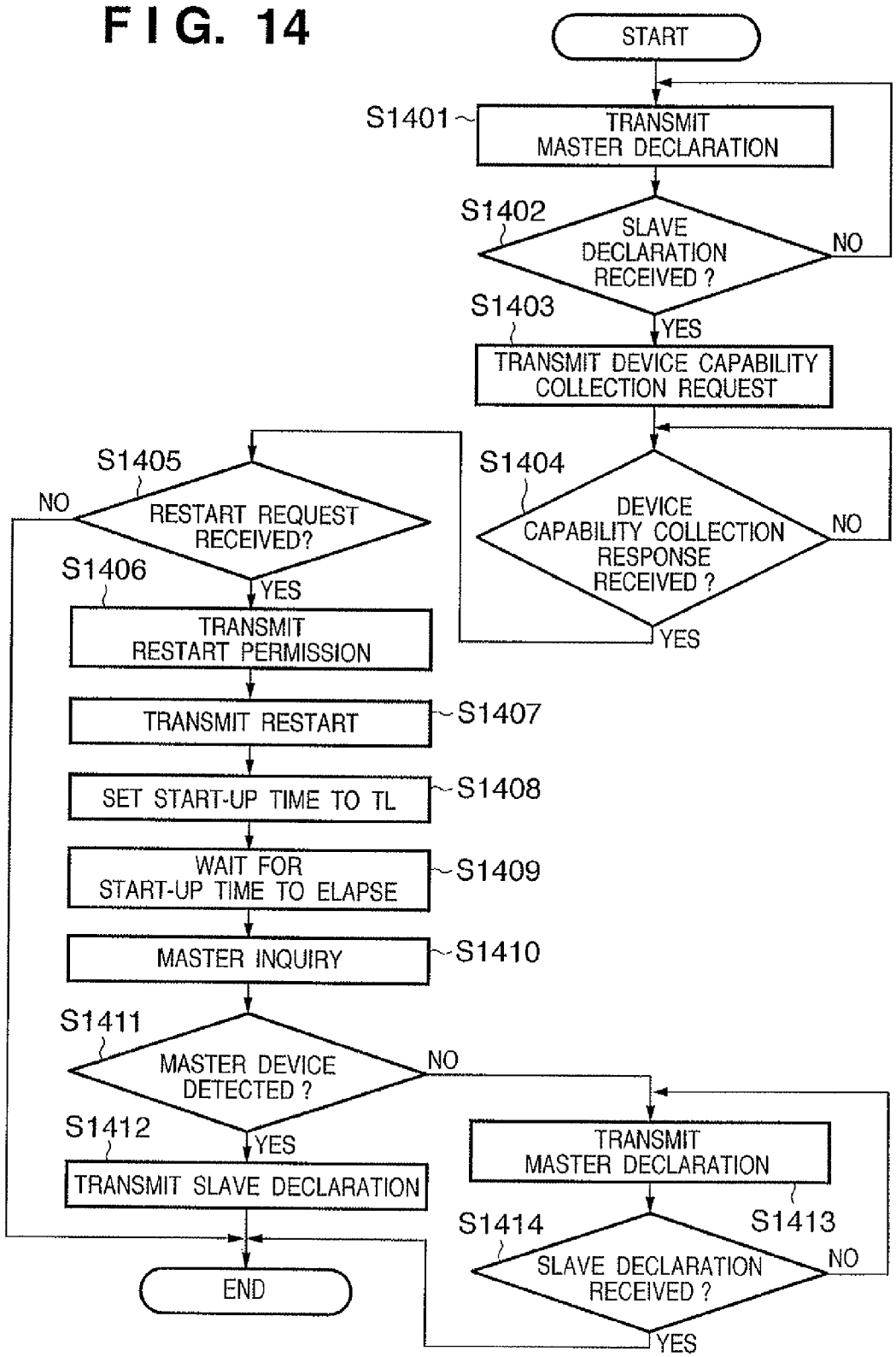
FIG. 14 shows an operation algorithm of the master process of FIG. 5 in the third embodiment.

FIG. 14 shows an operation algorithm of the master process (S504 in FIG. 5) in the present embodiment.

First, at step S1401, the device broadcasts a master declaration message. This corresponds to the master declaration message F1204 in FIG. 12.

At step S1402, the device determines whether a slave declaration message has been received in response to the master declaration. If a slave declaration message has been received (step S1402: YES), the device proceeds to step S1403, and if a slave declaration message has not been received (step S1402: NO), the device returns to step S1401.

At step S1403, the device transmits a device capability collection request to the source device of the slave declaration message. This corresponds to the device capability collection request F1502 in FIG. 15.

At step S1404, the device determines whether a device capability collection response has been received. If a device capability collection response has been received (step S1404: YES), the device proceeds to step S1405, and if a device capability collection response has not been received (step S1404: NO), the device continues to wait for receipt.

At step S1405, the device determines whether a restart request has been received. If a restart request has been received (step S1405: YES), the device proceeds to step S1406, and if a restart request has not been received (step S1405: NO), the device ends the process.

At step S1406, the device transmits a restart permission to the source device of the restart request. This corresponds to transmission of the restart permission F1505 in FIG. 15.

At step S1407, the device transmits a restart to the source device of the restart request. This corresponds to transmission of the restart F1206 in FIG. 12.

The device then sets the master inquiry start-up time to TL (step S1408). Next, the device waits for the master inquiry start-up time TL to elapse (step S1409), and when the TL time elapses, the device broadcasts a master inquiry (step S1410). This corresponds to transmission of the master inquiry F1207 in FIG. 12.

At step S1411, the device checks whether a master declaration message has been received within the response waiting time for the master inquiry. If a master device is detected by receiving a master declaration message (step S1411: YES), the device proceeds to step S1412. If a master device is not detected (step S1411: NO), the device proceeds to step S1413.

At step S1412, the device transmits a slave declaration message to the master device. This corresponds to transmission of the slave declaration message F1211 in FIG. 12.

At step S1413, the device itself becomes the master device and transmits a master declaration message, since a master device was not detected.

At step S1414, the device determines whether a slave declaration message has been received within the response time for the master declaration. If a slave declaration message has been received (step S1414: YES), the device ends the process. If a slave declaration message has not been received (step S1414: NO), the device returns to step S1413 and transmits master declaration messages periodically.

According to the present embodiment, a device newly entering a network receives a device capability from the master device, and compares its own device capability with that of the master device. Only in the case where the device decides that it is better suited as the master device does the device newly become the master device by transmitting a restart request similar to the first embodiment. Consequently, the better-suited device is able to newly become the master device even if a master device already exists.

Fourth Embodiment

The configuration of a communication system according to a fourth embodiment is the same as the configuration of the communication system shown in FIG. 5 in the second embodiment.

Figure 17:
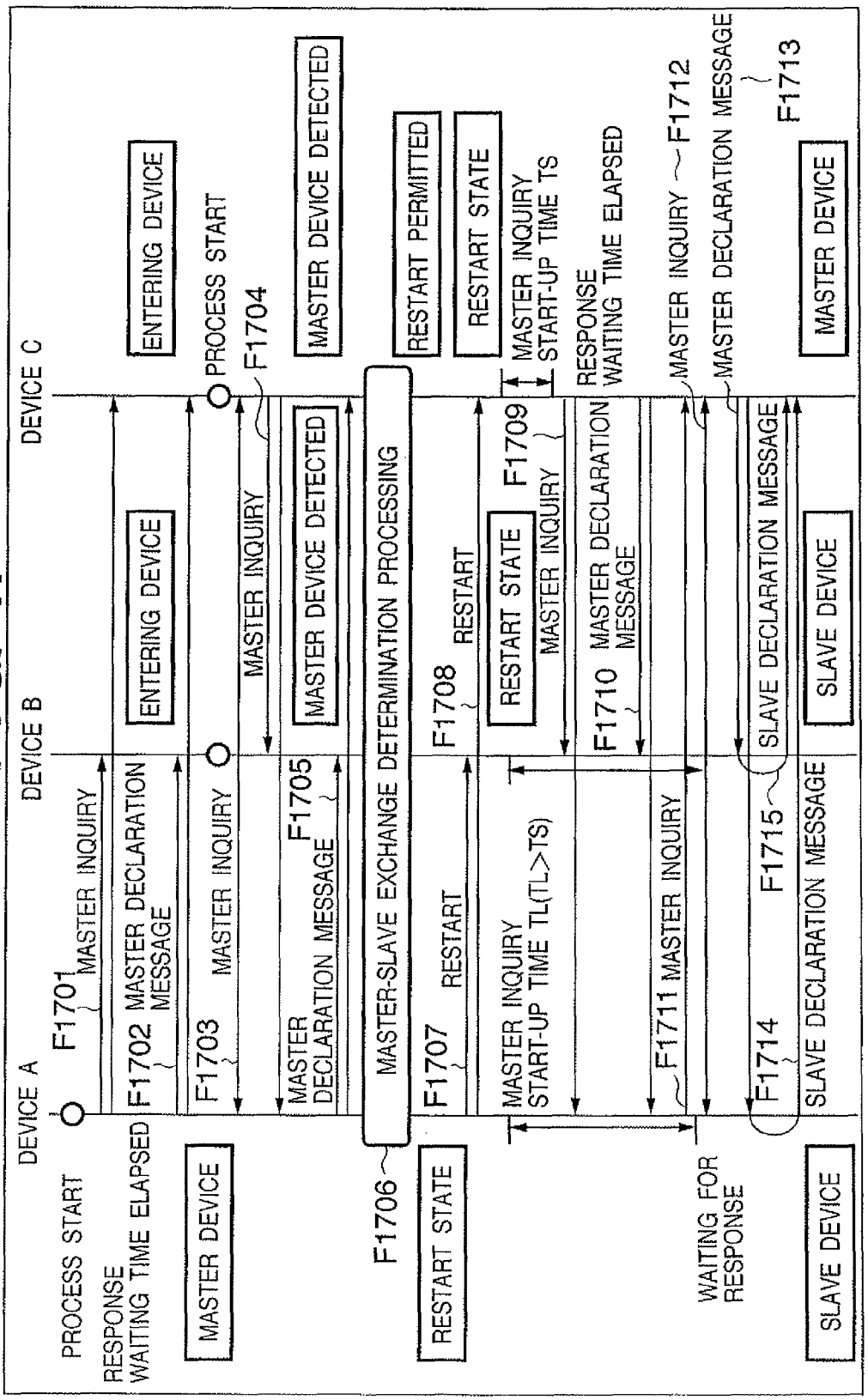
FIG. 17 shows an operation sequence in the fourth embodiment.

FIG. 17 shows an operation sequence in the present embodiment.

Processing for connecting to an ad hoc network is started when the communication setting button 804 of the device A is pressed, and a master inquiry F1701 is broadcast.

If a response waiting time elapses without a response to the master inquiry, the device A decides that a master device is not entered in the ad hoc network, and becomes the master device by transmitting a master declaration message F1702. The device A also continues to broadcast master declaration messages periodically.

Next, when processing to connect to the ad hoc network is started by pressing the communication setting button 805 of the device B, a master inquiry F1703 is broadcast.

Also, when processing for connecting to the ad hoc network is started by pressing the communication setting button 806 of the device C, a master inquiry F1704 is broadcast.

Figure 18:
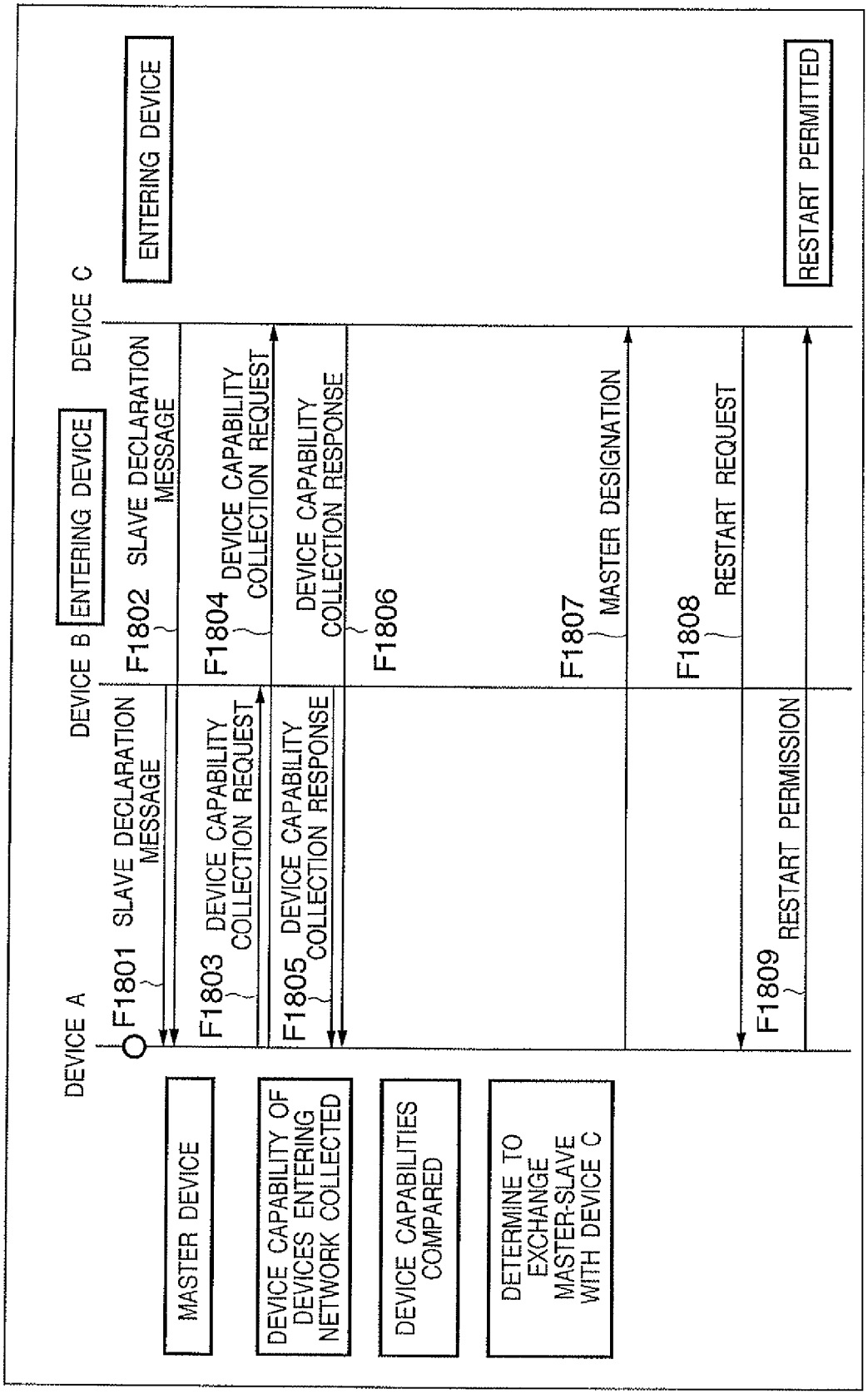
FIG. 18 shows an operation sequence of the master-slave exchange determination process in FIG. 17.

On receiving a master declaration message F1705 from the device A in response to respective master inquiries, the devices B and C detect that a master device exists in the network. The master-slave exchange determination process F1706 is then started. The master-slave exchange determination process is described with reference to FIG. 18.

The devices B and C, having detected that a master device exists in the ad hoc network, transmit slave declaration messages F1801 and F1802 (FIG. 18) to the master (device A).

The device A, having received the slave declaration messages, transmits device capability collection requests F1803 and F1804 to the devices B and C. Note that the device A also includes its own device capability in the transmitted device capability collection requests.

The devices B and C, having received the device capability collection requests, transmit their own device capability to the device A as device capability collection responses F1805 and F1806.

The device A compares the device capability of the devices B and C acquired from the device capability collection responses F1805 and F1806 with its own device capability, and determines whether to perform a master-slave exchange with the device B or the device C. Here, description relates to the case in which the device A determines to perform master-slave exchange with the device C.

The device A transmits a master designation F1807 to the device C in the case where it has been determined to exchange the roles of master and slave with the device C. On receiving the master designation F1807 from the device A, the device C transmits a restart request F1808 to the device A.

On receiving the restart request F1808 from the device C, the device A transmits a restart permission F1809 to the device C. On receiving the restart permission F1809 from the device A, the device C stores the receipt of restart permission, and waits to receive a restart.

Returning to the description of FIG. 17, the device A transmits restarts F1707 and F1708 to the devices B and C, and transfers to the restart state. The devices B and C, having received the restarts F1707 and F1708, also transfer to the restart state.

The device A, having transferred to the restart state, sets the master inquiry start-up time to TL, and waits for the TL time to elapse.

The device B, having transferred to the restart state, sets the master inquiry start-up time to TL since a restart permission was not received in the master-slave exchange determination process, and waits for the TL time to elapse.

The device C, having transferred to the restart state, sets the master inquiry start-up time to TS since the receipt of restart permission was stored in the master-slave exchange determination process, and waits for the TS time to elapse. Here, the master inquiry start-up time TS is set to a smaller value than the master inquiry start-up time TL. This results in the device C, which is to newly become the master, transmitting a master inquiry before the devices A and B.

That is, in each device, the values of TL, which are set by the device that receives a restart request, and TS, which are set by the device that transmits a restart request and receives a restart permission, are prestored in the RAMs 205 and 305. TL and TS are set depending on the situation.

Once the response waiting time TS elapses, the device C broadcasts a master inquiry F1709. If the response waiting time elapses without receiving a master declaration message from another device, the device C broadcasts a master declaration message F1710. The device C thereafter operates as the master device.

On the other hand, once the master inquiry start-up time TL elapses, the device A broadcasts a master inquiry F1711. On receiving a master declaration message F1713 from the device C, which is now the master device, the device A transmits a slave declaration message F1714 to the device C. The device A thereafter operates as a slave device.

Also, once the master inquiry start-up time TL elapses, the device B broadcasts a master inquiry F1712. On receiving the master declaration message F1713 from the device C, which is now the master device, the device B transmits a slave declaration message F1715 to the device C. The device B thus continues to operate as a slave device.

The operation algorithm of the devices in the present embodiment is the same as the flowchart shown in FIG. 5 of the first embodiment, except for the operation of the restart process (S503) and the master process (S504).

Figure 19:
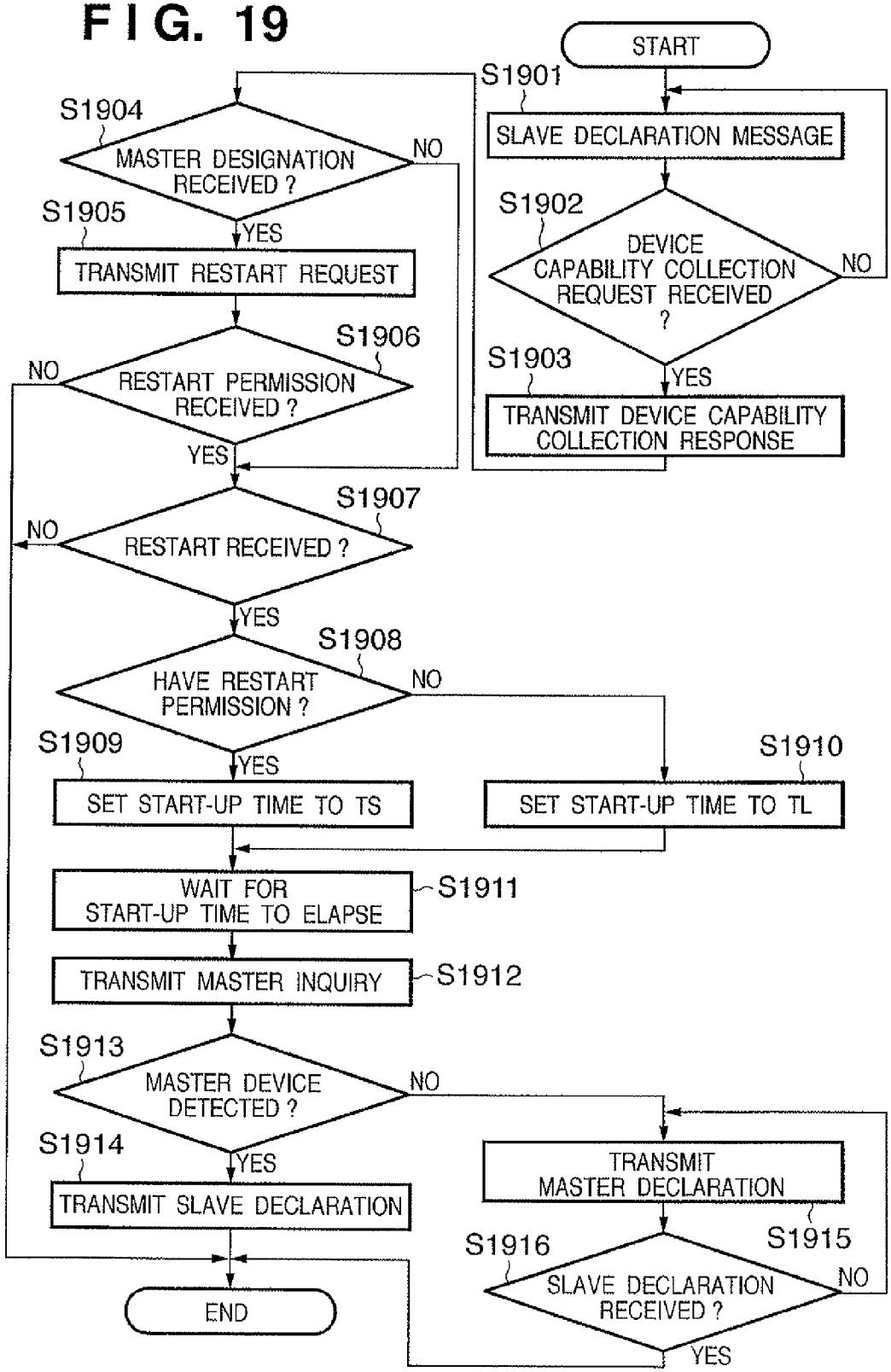
FIG. 19 shows an operation algorithm of the restart process of FIG. 5 in the fourth embodiment.

The operation algorithm of the restart process (S503 in FIG. 5) in the present embodiment is described using FIG. 19.

First, at step S1901, the device transmits a slave declaration message to the master device. This corresponds to transmission of the slave declaration messages F1801 and F1802 in FIG. 18.

At step S1902, the device waits to receive a device capability collection request from the master device. If a device capability collection request is received (step S1902: YES), the device proceeds to step S1903, and if a device capability collection request is not received (step S1902: NO), the device continues to wait for receipt.

At step S1903, the device transmits a device capability collection response to the master device. This corresponds to transmission of the device capability collection response F1805 or F1806 in FIG. 18.

At step S1904, the device determines whether a master designation has been received from the master device. If a master designation has been received (step S1904: YES), the device proceeds to step S1905, and if a master designation has not been received (step S1904: NO), the device proceeds to step S1907.

At step S1905, the device transmits a restart request to the master device. This corresponds to transmission of the restart request F1808 in FIG. 18.

At step S1906, the device determines whether a restart permission has been received from the master device. If a restart permission has been received (step S1906: YES), the device stores the receipt of restart permission and proceeds to step S1907. If a restart permission has not been received (step S1906: NO), the device ends the process.

At step S1907, the device determines whether a restart has been received. If a restart has been received (step S1907: YES), the device proceeds to step S1908, and it a restart has not been received (step S1907: NO), the device ends the process.

At step S1908, processing branches depending on whether the receipt of restart permission was stored at step S1906. If a restart permission had been received (step S1908: YES), the device proceeds to step S1909, and sets the master inquiry start-up time to TS. If a restart permission had not been received (step S1908: NO), the device proceeds to step S1910, and sets the master inquiry start-up time to TL.

The device then waits for the master inquiry start-up time to elapse (step S1911), and when the master inquiry start-up time elapses, the device transmits a master inquiry (step S1912). This corresponds to transmission of the master inquiry F1709 or the master inquiry F1712 in FIG. 17.

At step S1913, the device checks whether a master declaration message has been received within the response waiting time for the master inquiry. If a master device is detected by receiving a master declaration message (step S1913: YES), the device proceeds to step S1914, and if a master device is not detected (step S1913: NO), the device proceeds to step S1915.

At step S1914, the device transmits a slave declaration message to the master device. This corresponds to transmission of the slave declaration message F1715 in FIG. 17.

At step S1915, the device itself becomes the master device and transmits a master declaration message. This corresponds to transmission of the master declaration message F1713 in FIG. 17.

The device then determines whether a slave declaration message has been received, and if a slave declaration message has been received (step S1916: YES), the device ends the process. If a slave declaration message has not been received (step S1916: NO), the device returns to step S1915 and periodically transmits master declaration messages.

Figure 20:
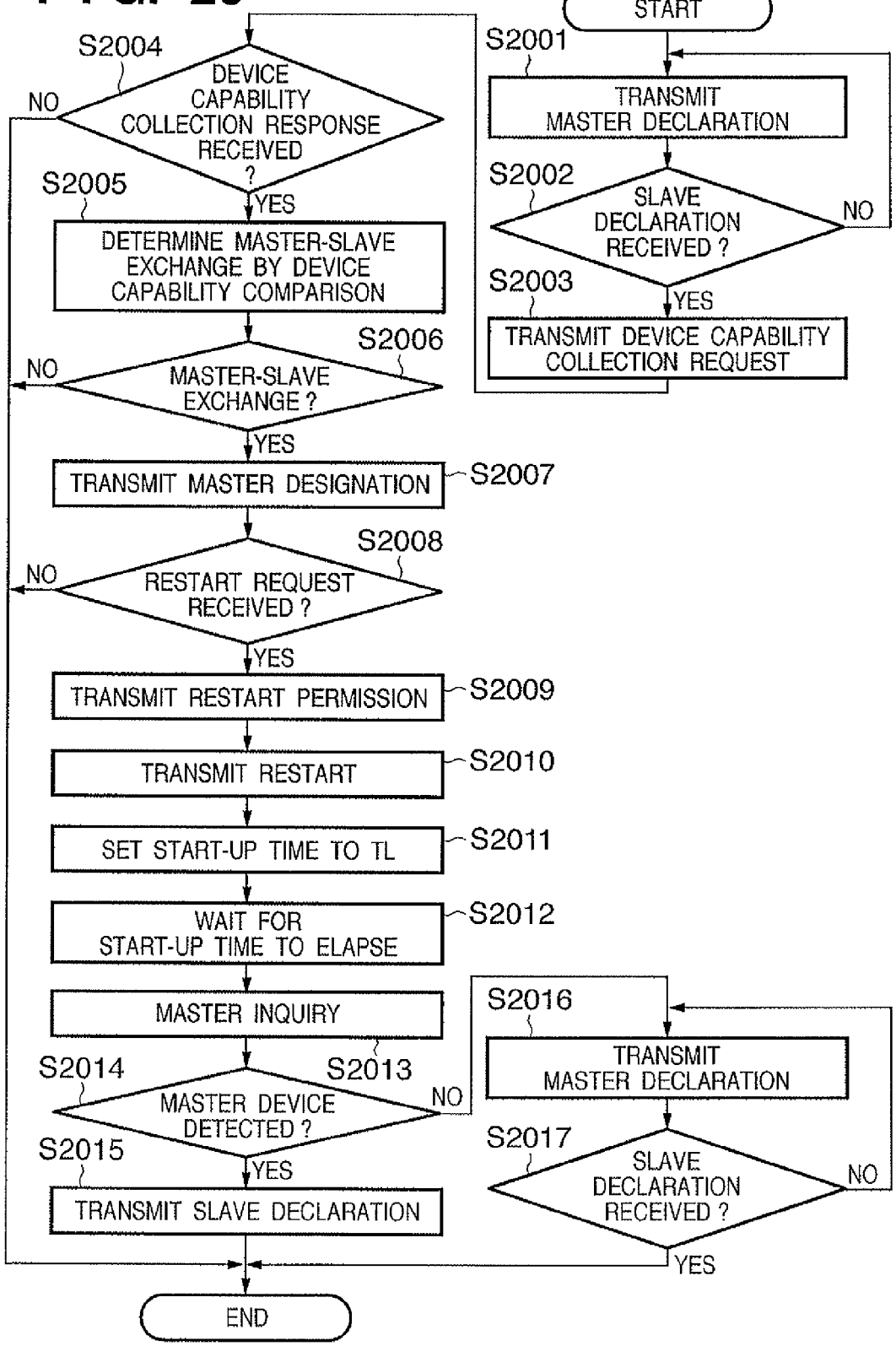
FIG. 20 shows an operation algorithm of the master process of FIG. 5 in the fourth embodiment.

The operation algorithm of the master process (S504 in FIG. 5) in the present embodiment is described using FIG. 20.

First, at step S2001, the device broadcasts a master declaration message.

At step S2002, the device then determines whether a slave declaration message has been received in response to the master declaration. If a slave declaration message has been received (step S2002: YES), the device proceeds to step S2003, and if a slave declaration message has not been received (step S2002: NO), the device returns to step S2001.

At step S2003, the device transmits a device capability collection request to the source device of the slave declaration message. This corresponds to the device capability collection requests F1803 and F1804 in FIG. 18.

At step S2004, the device determines whether a device capability collection response from a slave device has been received. If a device capability collection response has been received (step S2004: YES), the device proceeds to step S2005, and if a device capability collection response has not been received (step S2004: NO), the device ends the process.

At step S2005, the device performs the master-slave exchange determination process by device capability comparison, and if master-slave exchange will be performed (step S2006: YES), the device proceeds to step S2007. If master-slave exchange will not be performed (step S2006: NO), the device ends the process without performing master-slave exchange.

At step S2007, the device transmits a master designation to the device that is to newly become the master device. This corresponds to transmission of the master designation F1807 in FIG. 18.

At step S2008, the device determines whether a restart request from the device to which the master designation was transmitted has been received. If a restart request has been received (step S2008: YES), the device proceeds to step S2009, and if a restart request has not been received (step S2008: NO), the device ends the process.

At step S2009, the device transmits a restart permission to the source device of the restart request. This corresponds to transmission of the restart permission F1809 in FIG. 18.

At step S2010, the device transmits a restart to the slave device. This corresponds to transmission of the restarts F1707 and F1708 in FIG. 17.

The device sets the master inquiry start-up time to TL (step S2011). Then, the device waits for the master inquiry start-up time TL to elapse (step S2012), and when the TL time elapses, the device broadcasts a master inquiry (step S2013). This corresponds to transmission of the master inquiry F1711 in FIG. 17.

At step S2014, the device checks whether a master declaration message has been received within the response waiting time for the master inquiry. If a master device is detected by receiving a master declaration message (step S2014: YES), the device proceeds to step S2015. If a master device is not detected (step S2014: NO), the device proceeds to step S2016.

At step S2015, the device transmits a slave declaration message to the new master device. This corresponds to transmission of the slave declaration message F1714 in FIG. 17.

At step S2016, the device itself becomes the master device and transmits a master declaration message. The device then determines whether a slave declaration message has been received, and if a slave declaration message has been received (step S2017: YES), the device ends the process. If a slave declaration message has not been received (step S2017: NO), the device returns to step S2016 and transmits master declaration messages periodically.

In the present embodiment, the master device collects and compares the device capabilities of devices existing in a network, and transmits a master designation to the device that is to newly become the master device. Similar to the second embodiment, the device that receives the master declaration can newly become the master device by transmitting a restart request. Consequently, the better suited device is able to become the master device irrespective of the order of entry into the network.

Note that the collection request for device capability information may be transmitted when the number of slave devices reaches a prescribed number or more, rather than transmitting a collection request every time a slave declaration is received. Also, the collection request may be transmitted when the devices newly entering the network after the change to a new master device reaches a prescribed number or more. This makes it is possible both to reduce the load on the master device and traffic on the network, and to avoid the frequent occurrence of a restart process resulting from master-slave exchange.

Also, the master device may store the device capabilities collected up until that point, and only collect device capabilities from devices newly entering the network from then on. This makes it possible to reduce the load on the master device and traffic on the network, since it is no longer necessary to collect device capabilities from all of the devices every time.

Note that although the present embodiment has been described in relation to a device newly becoming the master device by initially making a master inquiry after a set waiting time has elapsed, other methods are also acceptable provided the method allows a device to newly become the master device. Examples include a method in which a device becomes the new master device by initially making a master declaration after the waiting time has elapsed.

Note that although in the present embodiment the device that constructs a new network becomes the master device and subsequently manages the MAC addresses of other devices existing in the same network, the definition of a master device is not limited to this. For example, there are also cases in which the master device only constructs the new network, with subsequent management and the like being carried out by another device. Alternatively, there are also cases in which network management is performed by the master device, and network construction is performed by a different device.

Although the above embodiments disclose printers and digital cameras as wireless communication apparatuses, the fact that the present invention is also applicable in devices capable of being equipped with a wireless communication function such as a camcorder, a monitor or a projector is noted here.

Also, although the above embodiments disclose a wireless LAN as wireless communication, the fact that the present invention is also applicable in other forms of wireless communication such as Bluetooth, Wireless USB, Wireless 1394, UWB and WiMAX is noted here. Further, the present invention, not being limited to wireless communication, is also applicable in cable communication such as cable LAN, USB and IEEE1394.

According to the embodiments, as described above, the better suited device is able to newly become the master device even if a master device already exists in the network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-342228 filed on Nov. 28, 2005, which is hereby incorporated by reference herein in its entirety.

The invention claimed is:

1. A communication apparatus, comprising:
a searching unit configured to search for a master device of a network;
a master unit configured to become the master device of the network, if the master device does not exist in the network based on a search result of the search unit;
an obtaining unit configured to obtain a display unit capability information from the master device, if the master device exists in the network based on the search result of the search unit;

a comparing unit configured to compare a display unit capability of the communication apparatus with the display unit capability of the master device, based on the display unit capability information obtained by the obtaining unit;

a determination unit configured to determine whether the communication apparatus is to newly become the master device, based on a comparison result of the comparing unit;

a restart unit configured to restart an operation for deciding on a new master device with the master device, based on the determination by the determination unit; and a setting unit configured to set a start time of an operation for newly deciding on the master device, wherein the setting unit sets the start time of the communication apparatus to a smaller value than the start time of another communication apparatus in a case that the communication apparatus newly becomes the master device.

2. The communication apparatus according to claim 1, wherein, in case that the communication apparatus operates as a slave device, the setting unit sets the start time of the communication apparatus to a larger value than the start time of the other communication apparatus, which operates as the master device.

3. The communication apparatus according to claim 1, wherein the restart unit requests that the master device searched by the searching unit performs an operation for deciding on a new master device.

4. The communication apparatus according to claim 1, further comprising:

an acquisition unit configured to acquire a device capability of the master device searched by the searching unit; and a decision unit configured to decide whether to exchange the master device and a slave device, based on the device capability acquired by the acquisition unit, wherein the setting unit sets the start time based on to the decision by the decision unit.

5. The communication apparatus according to claim 1, further comprising:

an acquisition unit configured to acquire a device capability of the master device; and a detection unit configured to detect a user instruction as to whether to exchange the master device and a slave device, wherein the setting unit sets the start time based on the detection by the detection unit.

6. The communication apparatus according to claim 1, further comprising:

a notifying unit configured to notify the master device of a device capability of the communication apparatus; and a master designation reception unit configured to receive a master device designation, wherein the setting unit sets the start time based on a result of the reception by the master designation reception unit.

7. The communication apparatus according to claim 1, wherein the setting unit sets a standby time to a smaller value than a standby time of the master device, if the communication apparatus operates as the slave device and a restart permission is received as a response to a restart request.

8. A control method for a communication apparatus, comprising, when the communication apparatus operates as a slave device:

a searching step of searching for a master device of a network;

a becoming step of becoming a master device of the network, if the master device does not exist in the network based on a search result of the searching step;

an obtaining step of obtaining a display unit capability information from the master device, if the master device exists in the network based on the search result of the searching step;

a comparing step of comparing a display unit capability of the communication apparatus with the display unit capability of the master device, based on the display unit capability information obtained at the obtaining step;

a determination step of determining whether the communication apparatus is to newly become the master device, based on a comparison result of the comparing step;

a restarting step of restarting an operation for deciding on a new master device with the master device, based on the determination at the determination step; and a setting step of setting a start time of an operation for newly deciding on the master device, wherein the setting step sets the start time of the communication apparatus to a smaller value than the start time of another communication apparatus in a case that the communication apparatus newly becomes the master device.

9. A non-transitory computer-readable storage medium on which is stored a computer program for making a computer function as a communication apparatus of claim 1.

* * * * *